US008638799B2

United States Patent
Mudigonda et al.

(10) Patent No.: US 8,638,799 B2
(45) Date of Patent: Jan. 28, 2014

(54) ESTABLISHING NETWORK QUALITY OF SERVICE FOR A VIRTUAL MACHINE

(75) Inventors: Jayaram Mudigonda, San Jose, CA (US); Paul T Congdon, Granite Bay, CA (US); Partha Ranganathan, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 12/501,067

(22) Filed: Jul. 10, 2009

(65) Prior Publication Data

US 2011/0007746 A1  Jan. 13, 2011

(51) Int. Cl.
- H04L 12/28 (2006.01)
- H04L 12/56 (2006.01)
- G06F 15/173 (2006.01)
- G06F 9/455 (2006.01)
- G06F 9/46 (2006.01)

(52) U.S. Cl.
USPC ........... 370/395.21; 370/395.42; 370/409; 370/413; 370/429; 709/223; 710/22; 718/1; 718/103

(58) Field of Classification Search
USPC ........... 370/229, 230.1, 235, 395.21, 395.42, 370/409, 413, 429; 710/22; 709/223; 718/1, 718/103
See application file for complete search history.

(56) References Cited

U.S. PATENT DOCUMENTS

| | | | |
|---|---|---|---|
| 6,449,255 B1 * | 9/2002 | Waclawsky | 370/236 |
| 6,757,284 B1 * | 6/2004 | Galles | 370/394 |
| 7,145,914 B2 * | 12/2006 | Olarig et al. | 370/413 |
| 7,296,093 B1 * | 11/2007 | Olarig et al. | 709/250 |
| 7,606,965 B2 | 10/2009 | Njoku et al. | |
| 7,657,659 B1 | 2/2010 | Lambeth et al. | |
| 7,685,281 B1 | 3/2010 | Sariya et al. | |
| 7,710,871 B2 * | 5/2010 | Lavian et al. | 370/230 |
| 7,742,486 B2 * | 6/2010 | Nielsen et al. | 370/401 |
| 8,060,875 B1 | 11/2011 | Lambeth | |
| 2002/0021701 A1 * | 2/2002 | Lavian et al. | 370/401 |
| 2002/0161929 A1 * | 10/2002 | Longerbeam et al. | 709/250 |
| 2004/0117613 A1 * | 6/2004 | Edmondson | 713/150 |
| 2005/0089054 A1 * | 4/2005 | Ciancaglini et al. | 370/412 |
| 2005/0114541 A1 * | 5/2005 | Ghetie et al. | 709/232 |
| 2007/0079017 A1 * | 4/2007 | Brink et al. | 710/22 |
| 2007/0140277 A1 | 6/2007 | Chen et al. | |
| 2007/0162652 A1 * | 7/2007 | Go et al. | 710/22 |
| 2007/0299906 A1 | 12/2007 | Bose et al. | |
| 2008/0005782 A1 | 1/2008 | Aziz | |
| 2008/0163207 A1 * | 7/2008 | Reumann et al. | 718/1 |
| 2008/0235487 A1 * | 9/2008 | Illikkal et al. | 711/207 |
| 2008/0240111 A1 * | 10/2008 | Gadelrab | 370/395.7 |
| 2008/0250406 A1 * | 10/2008 | Carpenter et al. | 718/1 |
| 2008/0316922 A1 * | 12/2008 | Riddle et al. | 370/230 |
| 2009/0070761 A1 | 3/2009 | Zhao | |
| 2009/0119664 A1 | 5/2009 | Pike et al. | |

(Continued)

Primary Examiner — Alpus H Hsu

(57) ABSTRACT

A system and method for implementing a VM to identify a data packet for transmission, the data packet including a QoS the data packet is to receive as compared to another QoS that another data packet is to receive. The system and method further includes a SNIC to pull the data packet from the VM based upon the QoS the data packet is to receive. The system and method may also include a link scheduler module to transmit the data packet based upon the QoS the data packet is to receive. The system and method may also include a receiver to receive a management instruction from a network management device, the management instruction to dictate the QoS the data packet is to receive based upon a SLA.

20 Claims, 19 Drawing Sheets

(56) References Cited

U.S. PATENT DOCUMENTS

| | | |
|---|---|---|
| 2009/0125631 A1* | 5/2009 | Blom et al. .................... 709/228 |
| 2009/0147731 A1* | 6/2009 | Chion et al. .................. 370/328 |
| 2009/0216881 A1* | 8/2009 | Lovy et al. .................... 709/224 |
| 2009/0241113 A1 | 9/2009 | Seguin et al. |
| 2010/0027420 A1* | 2/2010 | Smith ........................... 370/235 |
| 2010/0054129 A1* | 3/2010 | Kuik et al. .................... 370/235 |
| 2010/0194985 A1* | 8/2010 | Unger et al. ................... 348/570 |
| 2010/0316067 A1* | 12/2010 | Chmara et al. ................ 370/468 |
| 2011/0029973 A1 | 2/2011 | Hara et al. |
| 2011/0035494 A1* | 2/2011 | Pandey et al. ................. 709/224 |
| 2011/0051723 A1* | 3/2011 | Rabie et al. ................... 370/389 |

\* cited by examiner

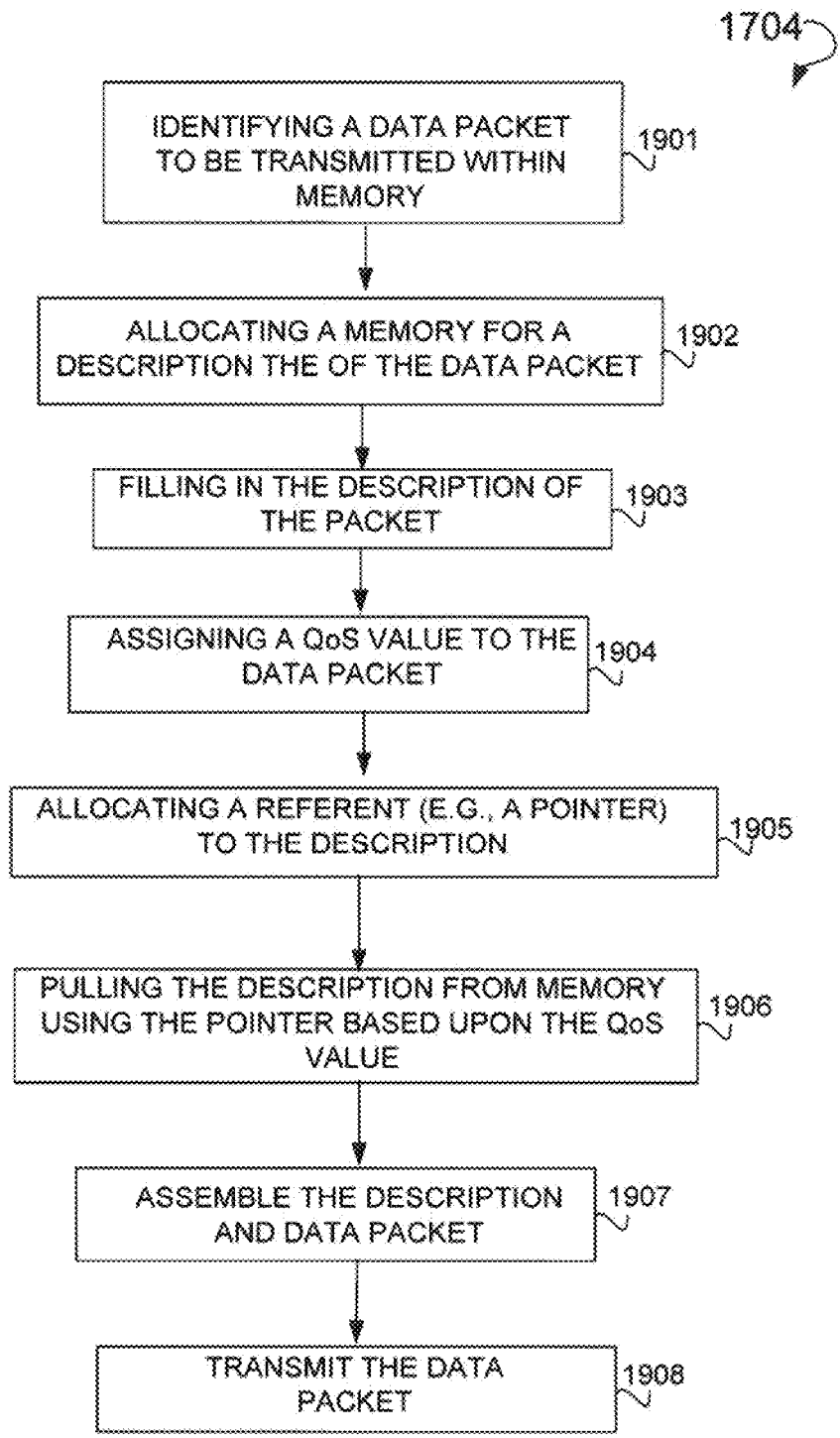

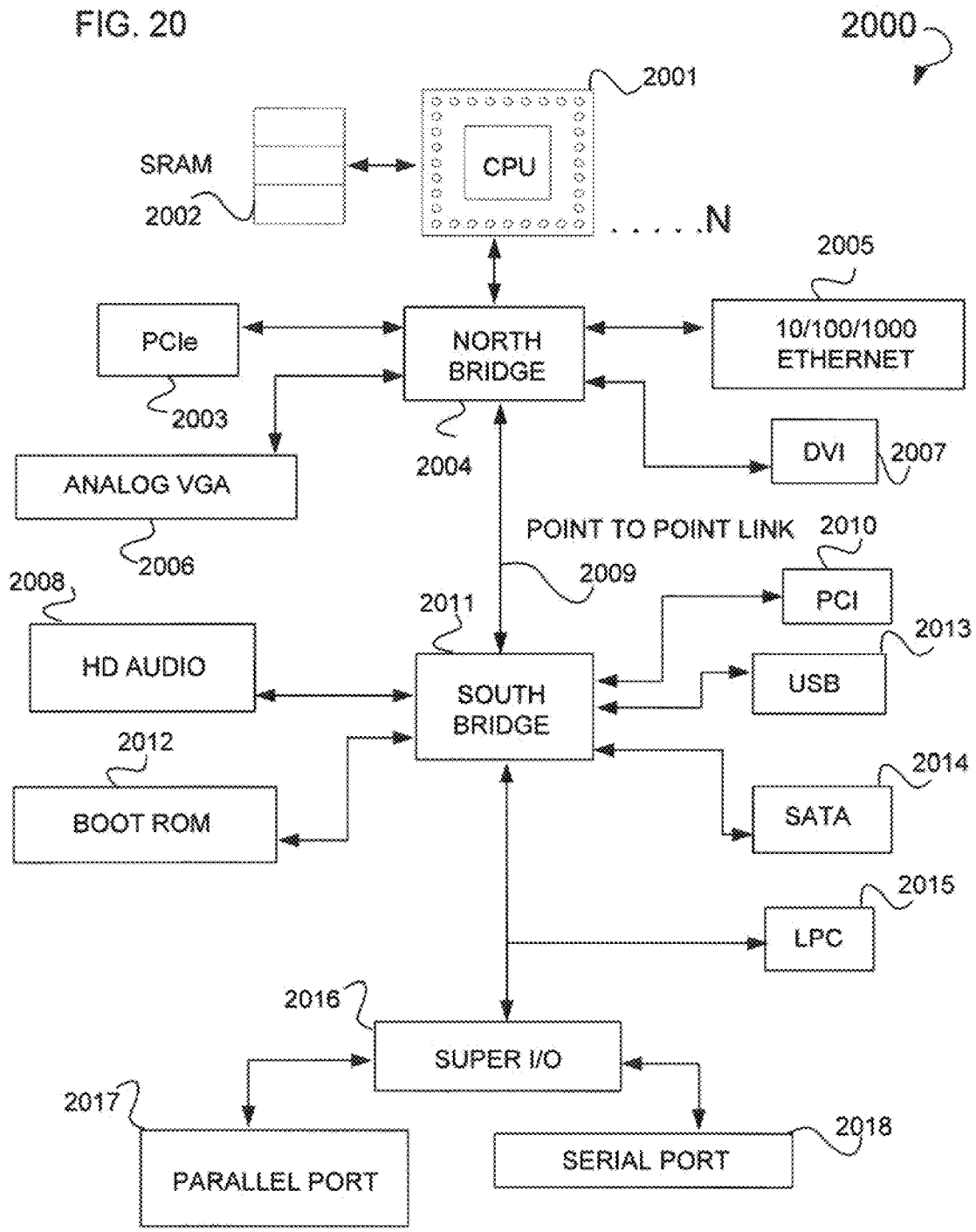

ESTABLISHING NETWORK QUALITY OF SERVICE FOR A VIRTUAL MACHINE

CROSS REFERENCE TO RELATED APPLICATIONS

This is non-provisional patent application that is related to U.S. patent application Ser. No. 12/362,876 entitled "SERVER SWITCH INTEGRATION IN A VIRTUALIZED SYSTEM" that was filed on Jan. 30, 2009, and which is incorporated by reference in its entirety.

BACKGROUND

Virtual Machines (VMs) are operating systems that share a single physical computer system. A plurality of VMs may be implemented on the computer system. Further, these VMs may communicate across a domain such as a network through the use of one or more protocols. The communication between these VMs may be in the form of data packets routed using one or more network devices.

BRIEF DESCRIPTION OF THE DRAWINGS

Some embodiments of the invention are described, by way of example, with respect to the following figures:

FIG. 19 is a flow chart illustrating the execution of an operation, according to an example embodiment, to configure a QoS management module to transmit a data packet.

FIG. 20 shows a diagrammatic representation of a machine in the example form of a computer system within which a set of instructions for causing the machine to perform any one or more of the methodologies discussed herein may be executed.

DETAILED DESCRIPTION

Figure 1:
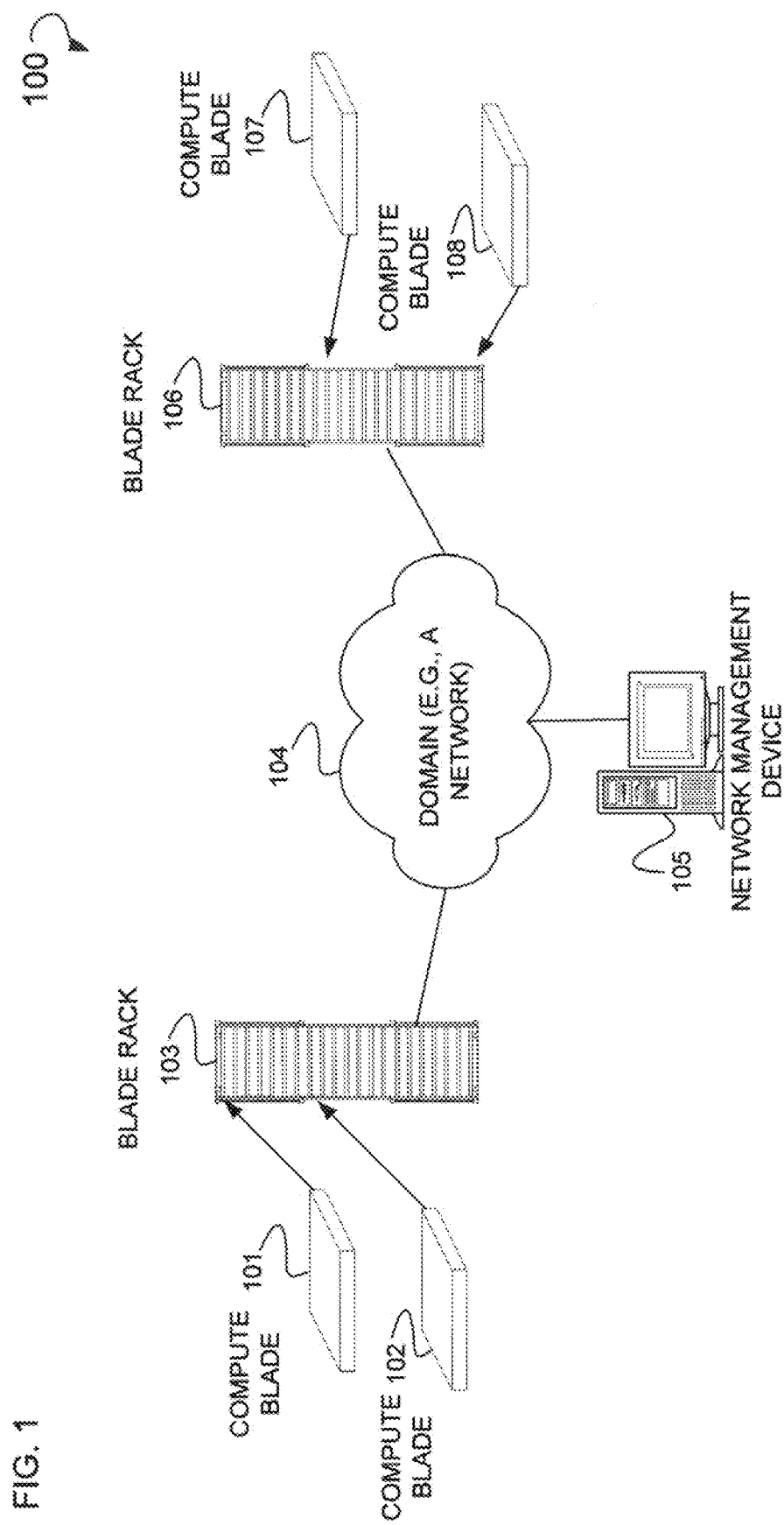
FIG. 1 is a diagram illustrating a system, according to an example embodiment, used to ensure end-to-end Quality of Service (QoS) for data transmitted between computer systems implementing VMs.

Illustrated is a system and method for ensuring end-to-end QoS for VMs communicating across a network domain. This end-to-end QoS is ensured through the use of a network device, such as a SNIC, to manage network traffic. The SNIC, in turn, is managed by a network management device. In some example embodiments, end-to-end QoS, referenced herein as QoS, is ensured for VMs communicating across a network domain through the use of a SNIC. QoS, as used herein, includes at least one of the following considerations ensuring low delay, high throughput, or reliability of a network. A VM is an operating system that may be implemented along with other operating systems on a computer system using a hypervisor. Types of VMs include Full Virtualization, Hardware-Assisted Virtualization, Partial Virtualization, Paravirtualization, and Operating System-Level Virtualization. A hypervisor or Virtual Machine Monitor (VMM) is a computer software/hardware platform virtualization that allows multiple VMs to run on a host computer system concurrently. As used herein, communicating across a network domain includes a physical or logical connection across a Local Area Network (LAN), a Wide Area Network (WAN), or other suitable network and associated topology. As used herein, a SNIC is a network device such as a router, switch or other suitable network device. QoS may be dictated by a SNIC, VM, or hypervisor and implemented via a layer 1, 2, or 3 protocols as defined in the Open Systems Interconnection (OSI) reference model, or Transmission Control Protocol/Internet Protocol (TCP/IP) stack model.

In some example embodiments, QoS within a network is ensured through the use of various network protocols such as Internet Protocol Version 4 (IPv4), and Internet Protocol Version 6 (IPv6) used in conjunction with the SNIC. Certain header fields in these protocols are used to denote the QoS that a data packet, destined for a VM, is to receive. For example, with respect to IPv4 a Type of Service (TOS) field is implemented. In Request For Comment (RFC) 791, the following 8 bits are allocated to the TOS field:
bits 0-2: precedence
bit 3: 0=Normal Delay, 1=Low Delay
bit 4: 0=Normal Throughput, 1=High Throughput
bit 5: 0=Normal Reliability, 1=High Reliability
bits 6-7: Reserved for future use This TOS field is used for, among other things, Differentiated Services ("DiffServ"). While the TOS field was obsoleted by RFC 2474, which created the Differentiated Services Codepoint (DSCP) as the first 6 bits of the one byte field, many in the art still refer to this byte in the header as the "TOS field." The TOS field, and associated bits included in the IPv4 header, allow different types of IP datagrams (e.g., datagrams particularly requiring low delay, high throughput, or reliability) to be distinguished from each other in terms of the level of service that each requires. Datagrams relating real-time data (e.g., used by an IP telephony application) can be distinguished from datagrams including relating to non-real-time traffic (e.g., File Transfer Protocol (FTP) related applications and data). The TOS field is used by network devices to define different levels of data packet treatment that can be provided by the network device to each data packet. This is called a Per Hop Behavior (PHB), in which the network device differentiates one packet from another based on the value of the DSCP. That is, real-time data may require a higher level of service, as compared to non-real-time traffic. In some embodiments, bandwidth is controlled by network devices (e.g., the SNIC) using the TOS field and the values included therein.

In some example embodiments, QoS within a network is ensured through the use of Resource ReSerVation Protocol (RSVP). RSVP defines how applications place reservations and how they can relinquish the reserved resources once the need for them has ended. RSVP operations result in resources being reserved in each network device along a path. As outlined in RFC 2205, RSVP defines a service class, or a reservation specification that defines the QoS that the service class is to receive, and a traffic specification that describes a data flow. Collectively, these concepts are referred to as "Flowspec." Additionally, RSVP defines a set of packets that are to be affected by a Flowspec. Specifically, through the use of RSVP, a network device is instructed as to how to select a subset of all the packets processed by the network device. The selection can depend on any attribute of a data packet (e.g. the recipient IP address or sender IP address, and port value as included in an IPv4 header or IPv6 header). This set of packets is defined via "Filterspec."

In some example embodiments, QoS within a network is ensured through the use of a control/management plane that manages a network device. Specifically, the control/management plane may be used to dictate what QoS a data packet is to receive from a network device. For example, through identifying a data packet by the sender IP address or recipient IP address, and port, as included in an IPv4 header or an IPv6 header, a QoS is provided for the data packet by the control plane logic of a network device.

In some example embodiments, QoS is ensured through the use of a layer 2 protocol such as Virtual Local Area Network (VLAN) tagging referenced in the Institute of Electrical and Electronics Engineers (IEEE) 802.1Q standard. In VLAN tagging a Priority Code Point (PCP) field is set in the VLAN tagging header to denote the QoS that a data packet is to receive. This field may be set to "0" to denote the lowest QoS up to "7" that denotes the highest QoS that a data packet is to receive. The SNIC may be used to manage the QoS ensured through the use of VLAN tagging.

In one example embodiment, the SNIC receives and processes data from the header of an IPv4 or IPv6 data packet to determine the QoS that the data packet is to receive. In some example cases, one VM is provided a higher QoS relative to another VM based upon a Service Level Agreement (SLA) as enforced by the SNIC, and dictated by a network management device that manages a network domain. An SLA is a part of a service contract where the level of network service for a VM is formally defined. Specifically, one VM may require low delay, high throughput, or better reliability relative to another VM. Example network management device managing the SNIC include a Cisco ACTIVE NETWORK ABSTRACTION™ (CANA) platform, a Hewlett-Packard OPEN VIEW™ platform, or other suitable network management device.

In one example embodiment, a data packet is transmitted utilizing, in part, the SNIC to determine the priority based upon which the data packet is to be transmitted from a computer system (e.g., a compute blade) that includes the SNIC. This data packet may be transmitted to another VM or, another, non-VM device. For example, the VM identifies a data packet that is to be transmitted by the computer system to another VM. A description of the data packet is allocated in the memory of the computer system that includes, for example, the IP address of the VM, computer system upon which the VM resides, or the non-VM device that is to receive the data packet. An example of a non-VM device is a computer system, cell phone, or Personal Digital Assistant (PDA), or any other suitable device that does not implement a virtual machine and a hypervisor. The SNIC associates a QoS with the data packet, and pulls the data packet from the VM based upon a priority dictated by the QoS. As illustrated above, the QoS may be dictated by a SLA as enforced by a SNIC.

FIG. 1 is a diagram illustrating an example system 100 used to ensure end-to-end QoS for data transmitted between computer systems implementing VMs. Shown is an example compute blade 101 and compute blade 102 that are included as part of the blade rack 103. The blade rack 103 and/or compute blades 101, and 102 are operatively connected to a domain 104. Operatively connected includes a logical or physical connection. The domain 104 is a network and includes a LAN, WAN, or some other suitable type network and associated topology. An example compute blade 107 and 108 are shown as part of the blade rack 106. Displayed rack 106 and/or compute blades 107 and 108 are operatively connected to the domain 104. In some example embodiments, a computer system in the form of a computing cluster, or other suitable computer system, is implemented in lieu of the blade rack 103 and blade rack 106. Further, shown is a network manager device 105 that is operatively connected to the domain 104. This network manager device 105 is used to manage the network traffic (e.g., the data transmitted between computer systems) within the domain 104.

Figure 2:
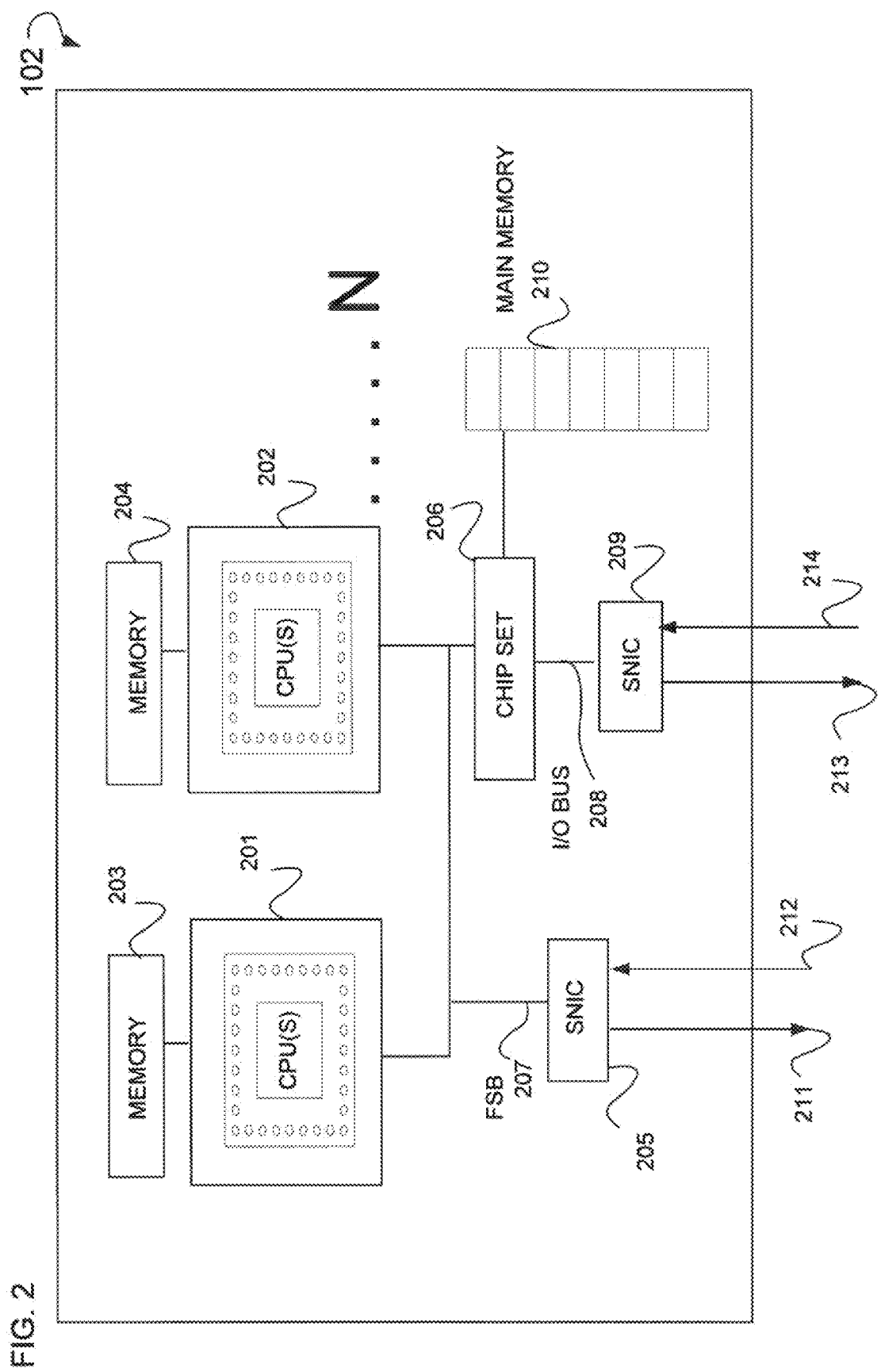
FIG. 2 is a diagram of a compute blade, according to an example embodiment, used to ensure end-to-end QoS between VMs.

FIG. 2 is a diagram of an example compute blade 102 that is used to ensure end-to-end QoS between VMs. As illustrated elsewhere, the end-to-end QoS may be between a VM that includes a SNIC and a non-VM device. Shown are a Central Processing Unit (CPU) 201 and CPU 202. In some example embodiments, a plurality of CPUs (e.g., multi-core) are implemented on the compute blade 102. Additionally, the CPU 201 and 202 may be processor dies. Operatively connected to CPU 201 is a memory 203. Operatively connected to CPU 202 is a memory 204. Further, illustrated is a chipset 206. This chipset 206 is operatively connected to CPU 201 and CPU 202 via a bus. Further, a main memory 210 is illustrated that is operatively connected to chipset 206 through an additional bus. Also shown is a SNIC 205 that is operatively connected to the CPU 201 and CPU 202 via a Front Side Bus (FSB). Additionally, a SNIC 209 is shown that is operatively connected to the chipset 206 via an Input/Output (I/O) bus 208. In some example embodiments, an input link 212 is implemented as an optical fiber connection, a copper connection, or a single input. An input link 214 is shown that also may be an optical fiber connection and a copper connection, or a single input. Also shown are output links 211 and 213. These output links 211 and 213 may be an optical fiber connection, a copper connection, or some other suitable type connection. The input link 212 and output link 211 provide an interface for the SNIC 205. A single SNIC may be implemented on the compute blade 102 to facilitate end-to-end QoS between VMs.

Figure 3:
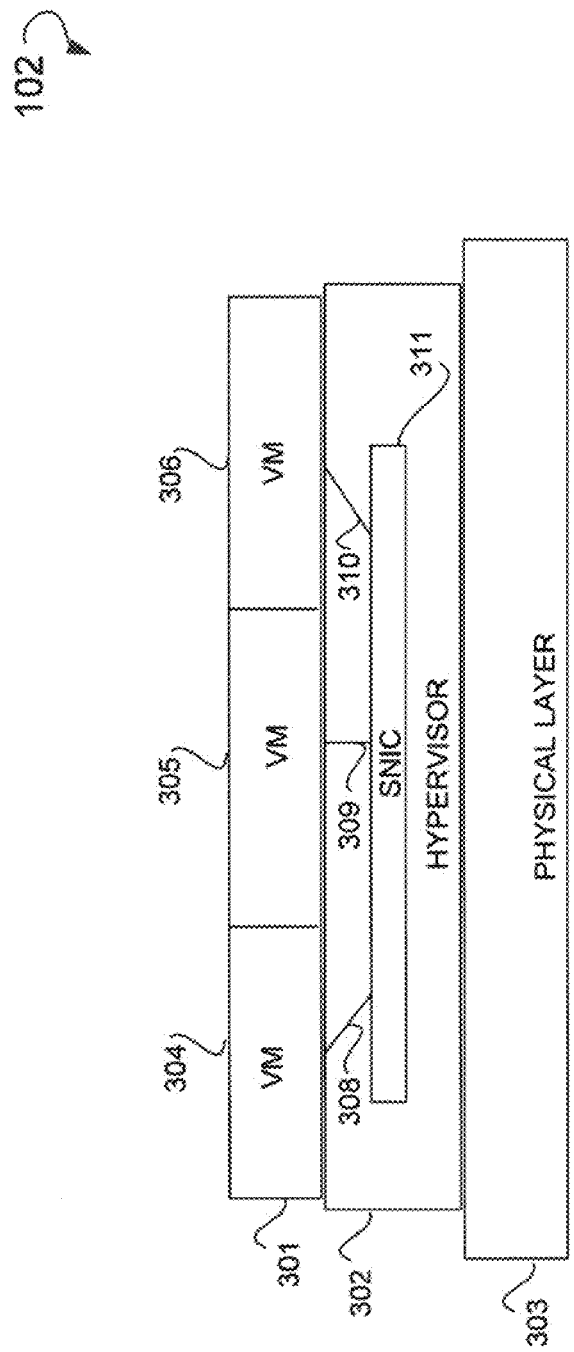
FIG. 3 is a diagram of a software implementation of a Switching Network Interface Card (SNIC) on a compute blade, according to an example embodiment.

FIG. 3 is a diagram of an example software implementation of a SNIC on a compute blade 102. Illustrated are various software architecture layers associated with the compute blade 102. Shown is a VM layer 301 that includes a plurality of VM's 304 through 306. Suitable VM/operating systems include, for example, the LINUX™ operating system, Microsoft Corporation's WINDOWS™ operating system, Sun Corporation's SOLARIS™ operating system, the UNIX™ operating system, or some other suitable operating system known in the art. Also shown is a hypervisor layer 302. The hypervisor layer 302 may be configured as a Type 1, Type 2, or Hybrid-Type hypervisor. Included as a part of this hypervisor layer 302 is a SNIC 311. This SNIC 311 may implement functionality akin to the SNIC 205. Further, illustrated are virtual ports 308 through 310 that allow for the SNIC 312 to interface with the VM's 304-306. Also shown is a physical layer 303 that may include some of the components outlined in the above shown FIG. 2. As will be more fully illustrated below, through the use of a SNIC 311 a plurality of VMs may be utilized and implemented. Moreover, as will be more fully illustrated below, through the use of the SNIC 311 additional VM's may be implemented on the physical layer 303 than may be otherwise implemented without the implementation of the SNIC 311. Specifically, through the use of the SNIC 311 resources associated with the physical layer 303 can be efficiently managed.

Figure 4:
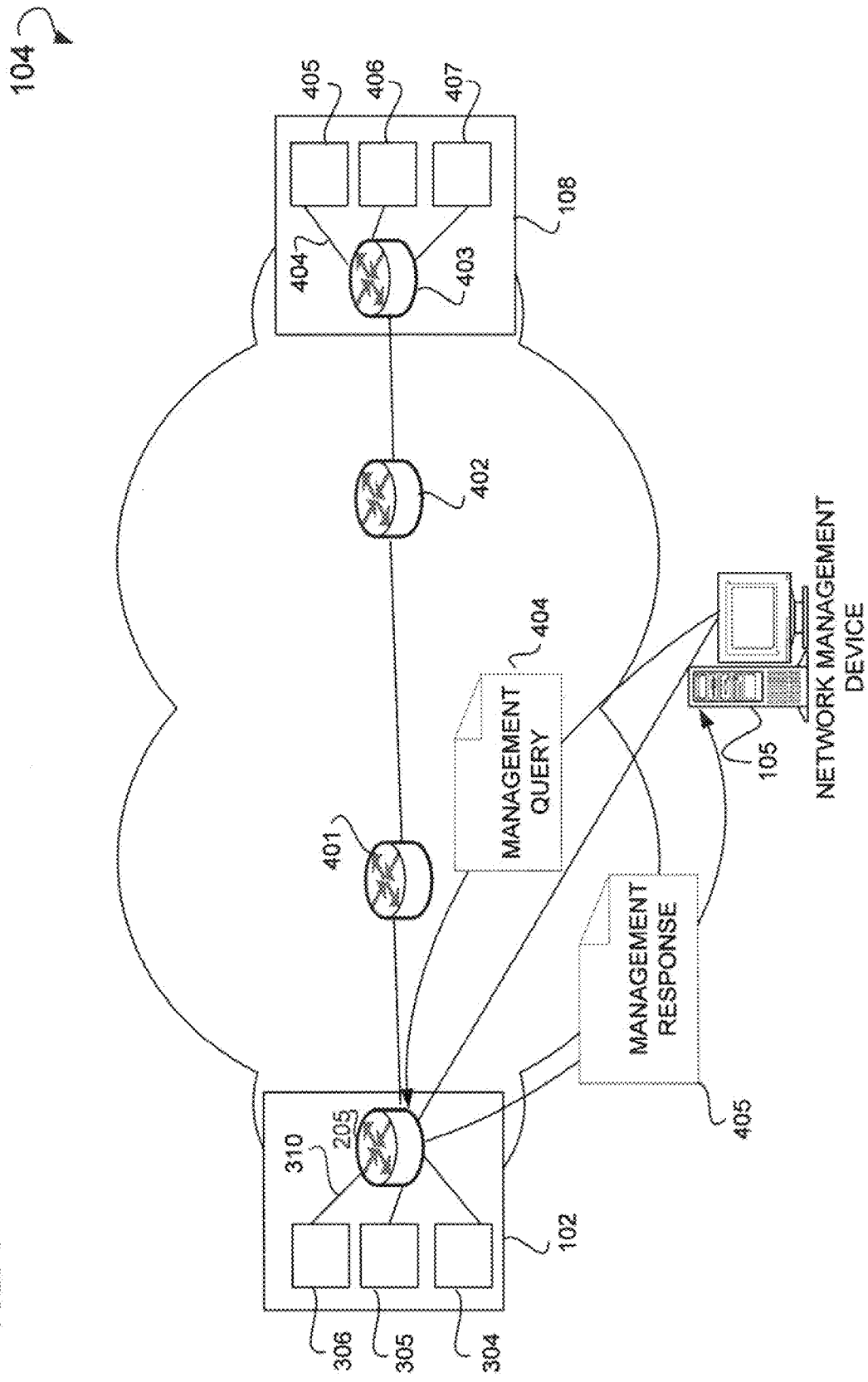
FIG. 4 is a diagram illustrating a domain, according to an example embodiment, where a network management device is used to configure a SNIC.

FIG. 4 is a diagram illustrating an example domain 104 where are a network management device is used to configure a SNIC. Shown is the compute blade 108. Residing upon the compute blade 108 is a network device in the form of a SNIC 403. Shown is the virtual portal 404 connecting the SNIC 403 and VM 405. The compute blade 108 is operatively connected to the compute blade 102 via a plurality of network devices. Shown, for example, are a network device 401 and a network device 402. These network devices 401 and 402 serve as hops between the compute blades 102 and 108. In one example embodiment, the network management device 105 transmits a manager query 404 to the SNIC 205. This management query 404 may be formatted using a Simple Network Management Protocol (SNMP), Network Configuration Protocol (Netconf), Command Line Interface (CLI) or other suitable protocol. Moreover, this management query 404 may include a request for information from the SNIC 205. This request may be with regard to the status of the SNIC 205 in terms of network traffic processed, latency, and other data related to the performance of the SNIC 205. In some example embodiments, the management query 404 seeks information relating to the VMs 304 through 306 serviced by the SNIC 205. This information includes, for example, network traffic received via a virtual port assigned to a VM, and other suitable information. Also shown, is a management response 405 that is generated by the SNIC 205, and received by the network management device 105. This management response 405 may be formatted using the aforementioned SNMP, Netconf, CLI, or some other suitable protocol. In some example embodiments, the management response 405 is formatted using an Internet Protocol Flow Information Export (IPFIX) protocol. Included in the management response 405 may be information related to the CPU cycles utilized by a VM, network traffic sent or received by a VM (see e.g., traffic rate information referenced below), or other suitable information.

Figure 5:
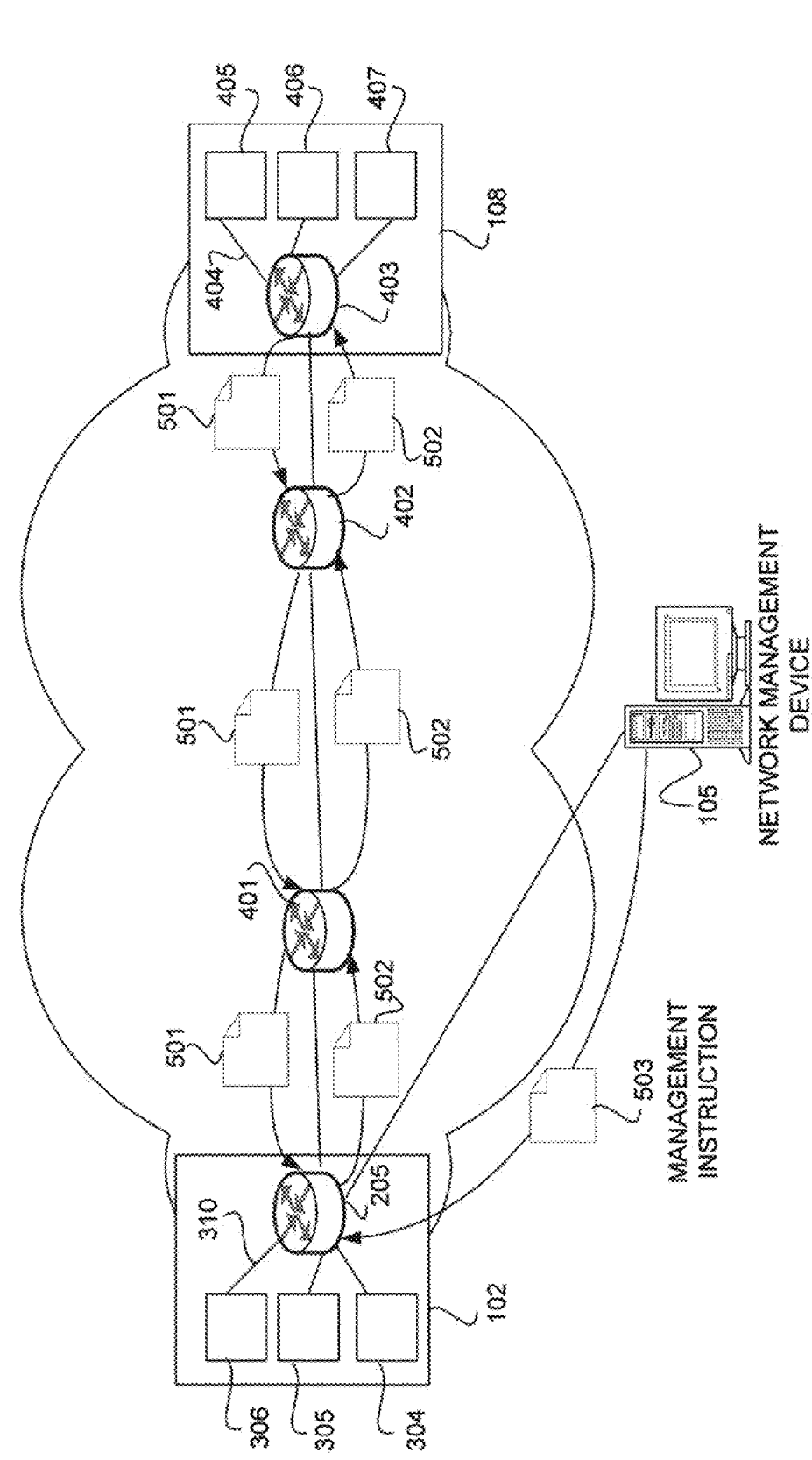
FIG. 5 is a diagram of a system, according to an example embodiment, illustrating the providing of a management instruction to a SNIC.

FIG. 5 is a diagram of an example system 104 illustrating the providing of a management instruction to a SNIC. Shown is the compute blade 108 that is utilized by a VM to transmit a data packet 501 along a plurality of network hops that include the network devices 401 and 402. Further, shown is a data packet 502 that is received by a VM utilizing the compute blade 108. This data packet 502 is received after being transmitted along a plurality of network hops that include the network devices 401 and 402. This plurality network hops include a shortest path between the compute blade 102 and compute blade 108. The network management device 105 transmits a management instruction 503 to the SNIC 205. This management instruction 503 may be formatted using SNMP, Netconf, CLI, or other suitable protocol. Included in this management instruction 503 is a priority instruction (e.g., a priority value) regarding one or more of the VMs 304 through 306 establishing a priority amongst these VMs in terms of their ability to receive and process network traffic. This priority instruction reflects an SLA that is to be enforced by the SNIC receiving the management instruction. This priority is used in the routing of the data packets 501 and 502.

Figure 6:
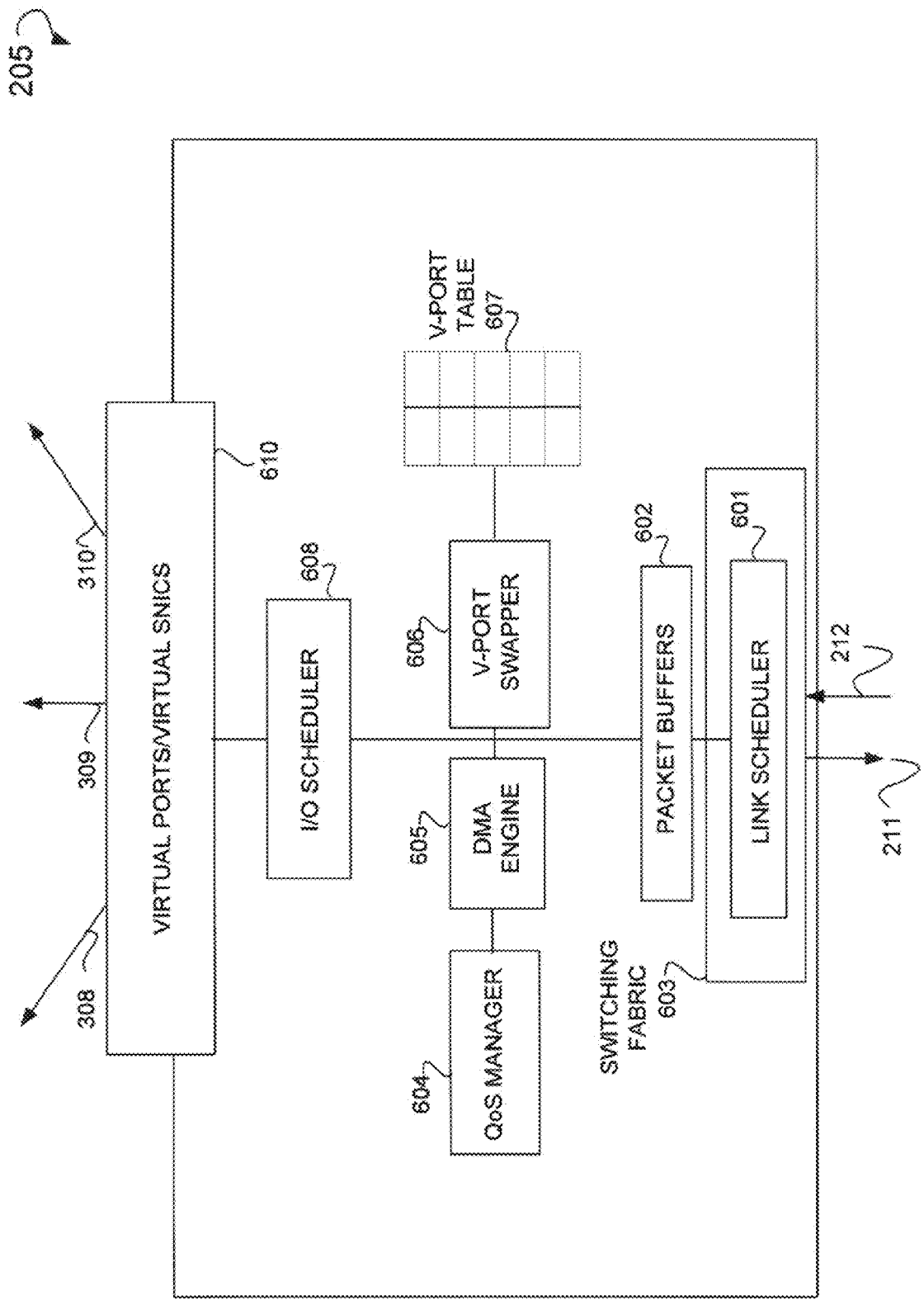
FIG. 6 is a diagram illustrating a SNIC, according to an example embodiment, and the various modules implemented therein.

FIG. 6 is a diagram illustrating an example SNIC, and the various modules implemented therein. Shown is a link scheduler 601 that is implemented as a part of the switching fabric 603. This link schedulers 601 is implemented to set incoming traffic rate and priority information for incoming data packets (e.g., the data packet 501 received by a VM utilizing the compute blade 102). Additionally, the link scheduler 601 is used to control and prioritize outgoing traffic. Optionally coupled to the switching fabric 603 is a packet buffer 602. Packet buffer 602 includes a data structure into which is placed incoming data packets (e.g., data packet 501). Packet buffer 602 is operatively connected to a QoS manager 604, DMA engine 605, V-port swapper 606, and V-port table 607 via a physical or logical connection. With respect to the QoS manager 604, this module establishes a priority, or otherwise assigns a priority, to each of the VMs serviced by the SNIC 205. This priority may be based upon the VM generating a data flow arising, or based upon the types of data arising from a particular VM. This priority is dictated by the previously referenced network management device 105. Further, the QoS manager 604 also resolves conflict between VMs based upon the aforementioned priority instruction received from the network management device 105. The Direct Memory Access (DMA) engine 605 sets a maximum traffic rate, a burstiness rate, and other traffic rate information for the SNIC 205. The V-port swapper 606 allocates/reallocates ports to VMs based upon the availability of the virtual ports. The V-port table 607 is a data structure that includes a mapping between virtual ports and VMs. In some example embodiments, a VM has multiple ports to a SNIC. The data structure may be a queue or some other suitable data structure. The QoS manager 604 analyzes the QoS values (e.g., the TOS value or the PCP field) included within the header of an incoming data packet such as data packet 501. Additionally, the QoS manager 604 is used to analyze command received from the network management device 105. QoS analysis is performed so as to prioritize incoming data packet within the packet buffer 602. Further, this prioritization may be based upon the priority assigned to each of the VM's service by the SNIC 205. Also, shown is an I/O scheduler 608 that schedules the transmission of data packets to the data stored in buffers to each of the VM is serviced by SNIC 205. In some example embodiments, the I/O scheduler 608 is flow aware in that it is able to prioritize data arriving from individual VMs based upon QoS considerations. Also shown is a virtual port or virtual SNIC 610, wherein the plurality of virtual ports may be implemented on a plurality of physical buses that are optionally connect to, for example, the CPU(s) 201 or 202. Buses include the previously referenced FSB 207 or 110 bus 208. Examples of virtual ports include the virtual ports 308 through 310.

Figure 7:
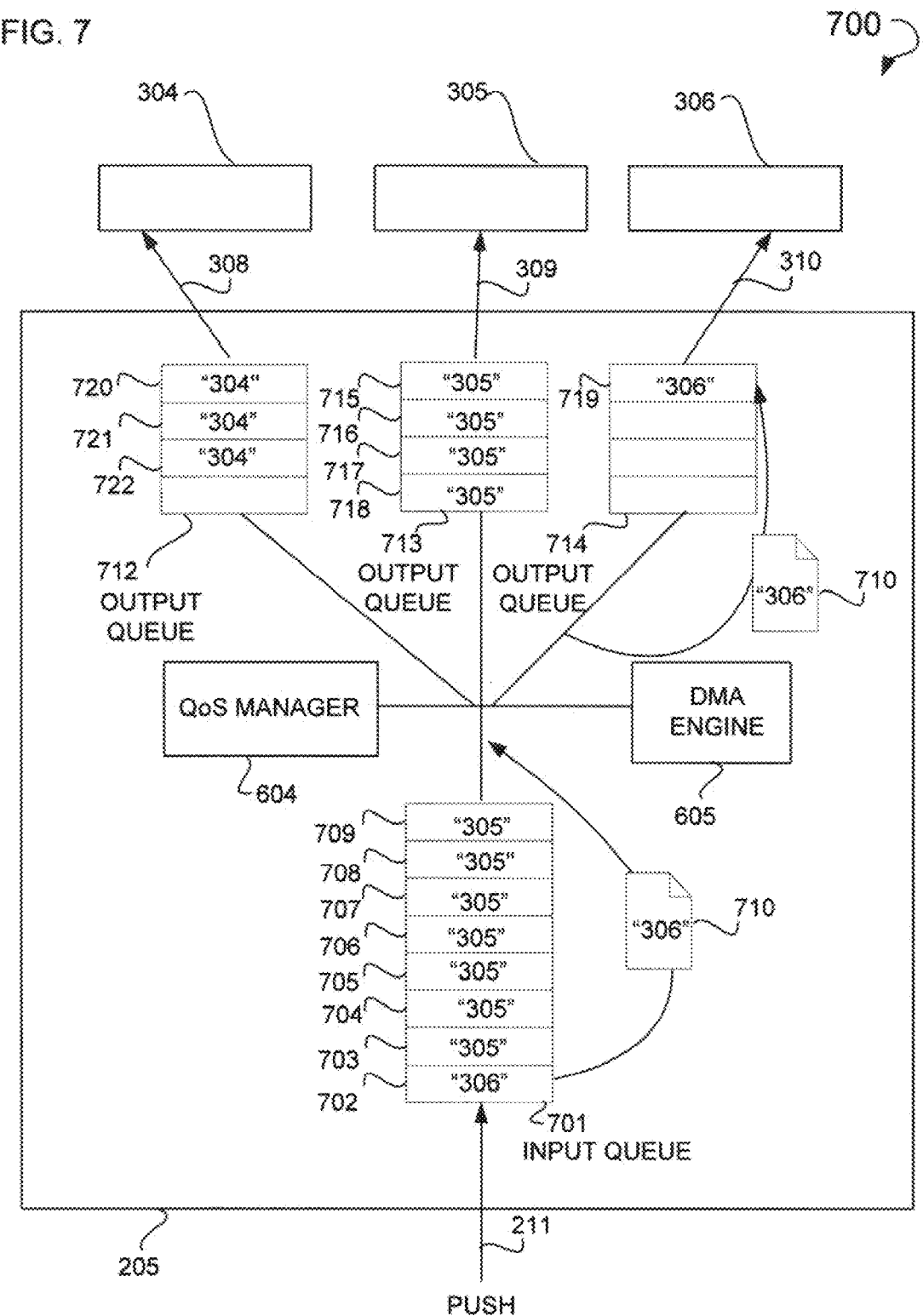
FIG. 7 is a diagram illustrating a VM latency avoidance policy, according to an example embodiment, enforced by a SNIC.

FIG. 7 is a diagram illustrating an example VM latency avoidance policy enforced by the SNIC 205. Shown is an input queue 701 that includes a number of queue entries 702 through 709 that are stored as part of the packet buffers 602. Also shown is an output queue 712 that includes entries 720 through 722, and output queue 713 that includes entries 715 through 718. Further illustrated is an output queue 719 that includes entry 719. In cases where the output queue 714 includes fewer entries than the output queues 712 and 713, priority is given to the output queue 714 in terms of traffic routed from the input queue 701 to the output queue 719. This priority is based upon a priority assigned to the VM 306 vis-à-vis the VMs 304 and 305 also serviced by the SNIC 205. This priority is reflected in an SLA for the VM 306 as enforced by the SNIC 205. As illustrated, the data packet 710 including data for the VM 306 is given priority in the input queue 701, and is put to the front of the queue 701 based upon the SLA. As illustrated elsewhere, to QoS manager 604, in combination with the DMA engine 605, enforces this policy of giving priority to data packets destined for the output queue 714 ultimately to VM 306.

Figure 8:
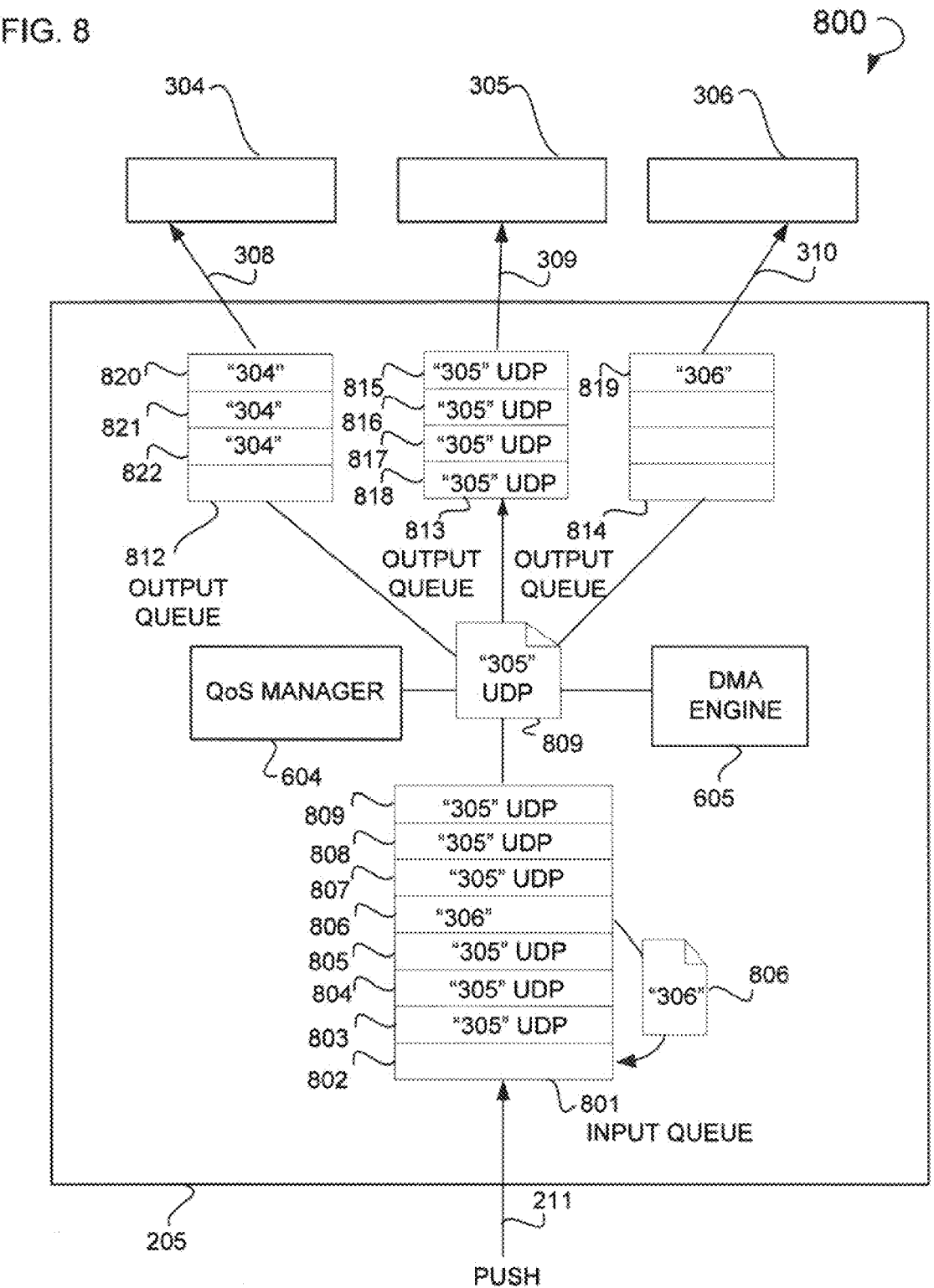
FIG. 8 is a diagram illustrating an execution of a system, according to an example embodiment, implementing a policy enforced by the SNIC to give priority to a VM executing a media-steaming application.

FIG. 8 is a diagram illustrating an example execution of a system 800 implementing a policy enforced by the SNIC 205 to give priority to a VM executing a media-steaming application. Shown is an input queue 801 that includes entries 803 through 809 and an empty entry 802. As illustrated entries 803 through 809 include User Datagram Protocol (UDP) formatted data associated with media streaming. A media streaming application includes a media player application such as the Adobe FLASH MEDIA PLAYER™, or Microsoft WINDOWS MEDIA PLAYER™. Output queue 812 includes entries 820 through 822, while output queue 814 includes entry 819. Further, shown is an output queue 813 is shown that included entries 815 to 818 in the form of UDP formatted entries. In some example embodiments, an SLA is enforced by the SNIC 205 that includes giving priority to data packets formatted for media streaming. This SLA may take priority over the SLA policy illustrated in FIG. 7. In some example embodiments, priority is given to data packets utilized in media streaming. If, for example, priority is given to the VM 305 due to the execution of a multimedia application on the VM 305 data packets in the input queue 801 may need to be resorted to reflect this priority. As illustrated, the data packet at position 806, a non-media streaming formatted data packet, is moved (e.g., re-sorted) to the end of the queue into the empty position 802 in order to reflect the SLA for VM 305. Further, the data packets at positions 803 through 805, and 807 through 809 may be moved as well.

Figure 9:
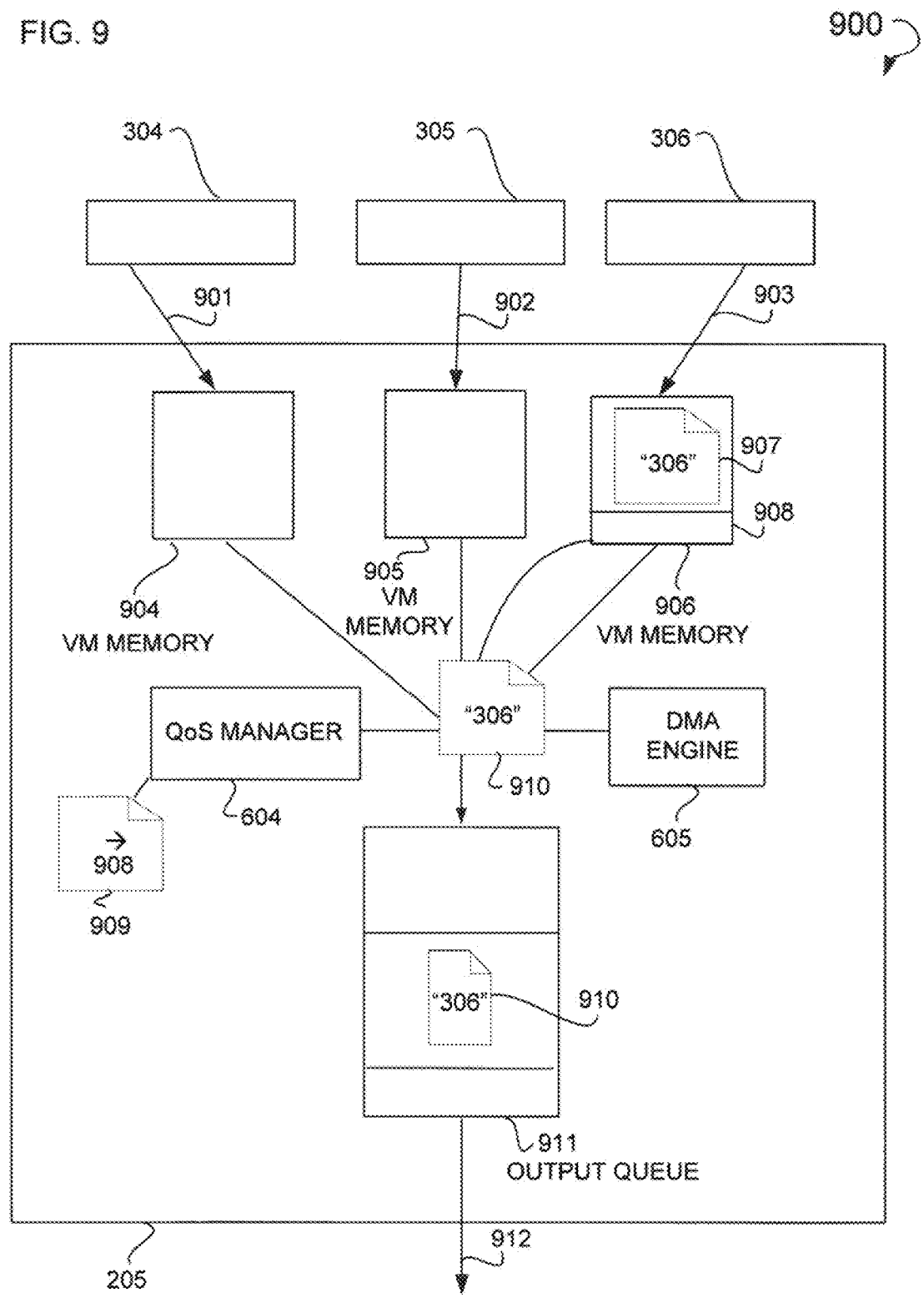
FIG. 9 is a diagram illustrating a system, according to an example embodiment, to transmit a data packet, using QoS, between VMs.

FIG. 9 is a diagram illustrating an example execution of a system 900 to transmit a data packet, using QoS, between VMs. Shown is a physical or logical connection between the various VMs 304 through 306, and the VM memory 904 through 906. This VM memory may be a collection of virtual memory pages. Illustrated is a data packet 907 that includes a load section with the value "306" that is contained in the VM memory 906. Also included in the VM memory 906 is a memory location 908 that includes a description of the destination of the data packet 907 and a QoS value for the data packet 907. In some example embodiments, a referent 909 (e.g., a pointer) is provided to the SNIC 205 that points to the memory location 908 where the description of the destination is stored. The SNIC 205 pulls the description from the memory location 908 using the referent 909 based upon the QoS value associated with the description of the destination. The QoS manager 604 may use this referent 909 to engaging in the pulling of the description. As illustrated at 910, this description is associated with the data packet 907 and stored into the output queue 911. Associated, as used herein, may include affixing the description of the destination as an IP address and port value to the data packet 907. The IP address may be the IP address of the receiving VM or computer. The port value may be a value identifying a software application executed by a computer. The link 912 may be used to transmit the data packet across a network.

Figure 10:
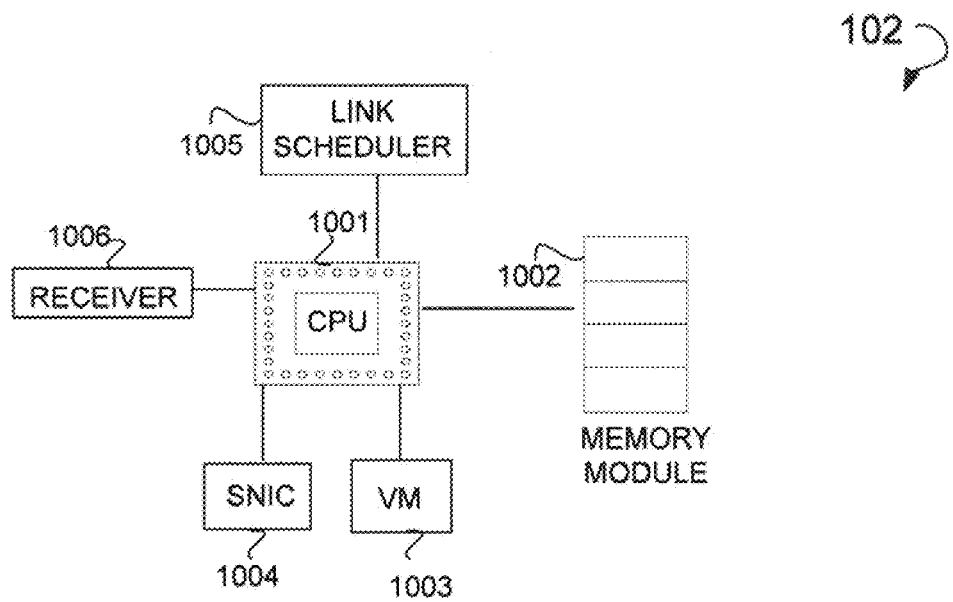
FIG. 10 is a block diagram of a computer system, according to an example embodiment, in the form of the compute blade used to ensure end-to-end QoS for the VMs residing thereon.

FIG. 10 is a block diagram of an example computer system in the form of the compute blade 102 used to ensure end to end QoS for the VMs residing thereon. These various blocks may be implemented in hardware, firmware, or software as part of the computer blade 101, or computer blade 102. In some example embodiments, the various blocks 1003 through 1005 may be implemented as part of the QoS manager 604. A CPU 1001 is shown operatively connected to memory module 1002. Operatively connected includes a logical or physical connection. A VM 1003 is operatively connected via a hypervisor (not pictured) to the CPU 1001 to identify a data packet for transmission, the data packet including a QoS the data packet is to receive as compared to another QoS that another data packet is to receive. A SNIC 1004 is operatively connected to the VM 1003 to pull the data packet from the VM 1003 based upon the QoS the data packet is to receive. A link scheduler module 1005 is operatively connected to the SNIC 1004 to transmit the data packet based upon the QoS the data packet is to receive. A receiver 1006 is operatively connected to the CPU 1001 to receive a management instruction from a network management device 105, the management instruction to dictate the QoS the data packet is to receive based upon an SLA. In some example embodiments, the VM 1003 assigns a descriptor to identify a device that is to receive the data packet. In some example embodiments, the memory module 1002 includes the data packet. In some example embodiments, the SNIC 1004 to pull of the data packet from the VM 1003 utilizes a pointer to an address of the data packet in the memory module. The computer system may utilize at least one of DiffServ, RSVP, a control/management plane, or VLAN tagging.

Figure 11:
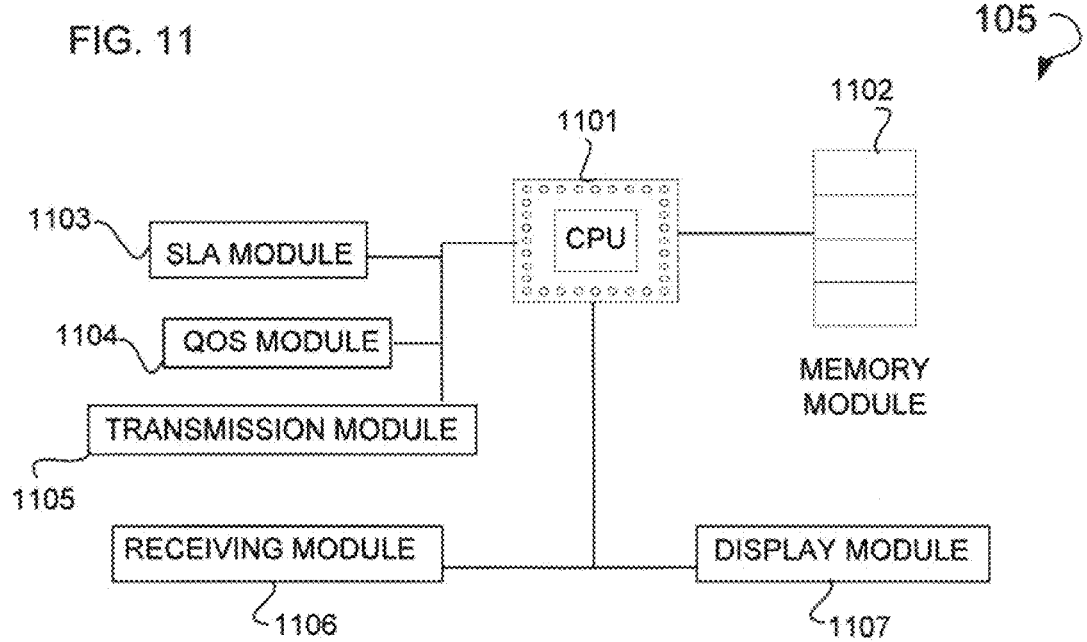
FIG. 11 is a block diagram of a computer system, according to an example embodiment, in the form of the network management device.

FIG. 11 is a block diagram of an example computer system in the form of the network management device 105. These various blocks may be implemented in hardware, firmware, or software. Shown is a CPU 1101 operatively connected to a memory 1102. An SLA module 1103 is shown to identify an SLA, the SLA corresponding to at least one VM and identifying a QoS that a data packet for the at least one VM is to receive. The SLA module 1103 is operatively connected to the CPU 1101. A QoS module 1104 is illustrated to retrieve QoS values, the QoS values identified by the SLA. The QoS module 1104 is operatively connected to the CPU 1101. A transmission module 1105 is shown that transmits a management instruction that identifies the QoS that the data packet for the at least one VM is to receive using the retrieved QoS values. The transmission module 1105 is operatively connected to the CPU 1101. In some example embodiments, the management instruction is formatted as a CLI based instruction. In some example embodiments, the transmission module 1105 transmits a management instruction formatted using a protocol that includes at least one of a SNMP, a Netconf protocol, or an Internetwork Operating System-Command Line Interface (IOS-CLI) based protocol. In some example embodiments, the QoS is based upon considerations that include at least one of per hop low delay, per hop high throughput, or per hop reliability. A receiving module 1106 is show to receive network data to identify network traffic for the at least one VM serviced by the network device. The receiving module 1106 is operatively connected to the CPU 1101. A display module 1107 is shown to provide a graphical illustration of the network device data. This display module 1107 is operatively connected to the CPU 1101. In some example embodiments, the network device includes at least one of a SNIC, or a router.

Figure 12:
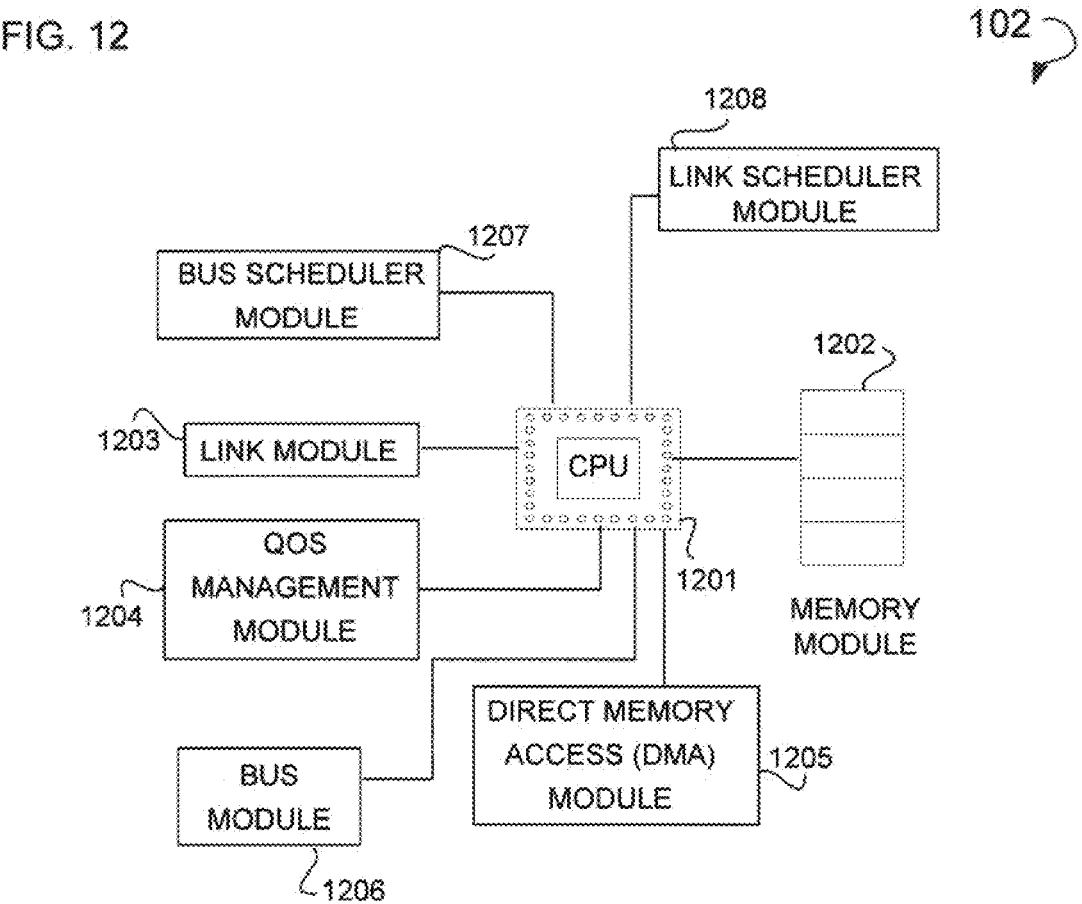
FIG. 12 is a block diagram of a computer system, according to an example embodiment, in the form of the compute blade used to ensure end-to-end QoS for the VMs residing thereon.

FIG. 12 is a block diagram of an example computer system in the form of the compute blade 102 used to ensure end-to-end QoS for the VMs residing thereon. These various blocks may be implemented in hardware, firmware, or software as part of the computer blade 101, or computer blade 102. A CPU 1201 is shown that is operatively connected a memory 1202. A link module 1203 is shown to receive a data packet that includes a QoS field associated with a QoS for at least one VM. This link module 1203 is operatively connected to a CPU 1201. A QoS management module 1204 is shown that identifies the QoS for the at least one VM, the at least one VM having a priority to receive the data packet as compared to another VM. The QoS management module 1204 is operatively connected to the CPU 1201. A DMA module 1205 is shown that assigns the data packet to a data structure based upon a value in the QoS field. The DMA module 1205 is operatively connected to the CPU 1201. A bus module 1206 is shown that transmits the data packet, using a bus module, to the at least one VM. The bus module 1206 is operatively connected to the CPU 1201. In some example embodiments, the QoS field is a TOS field, or a PCP field. Further, in some example embodiment, the link module uses a link layer protocol. Additionally, in some example embodiments, the QoS is based upon considerations that include at least one of per hop low delay, per hop high throughput, or per hop reliability. A bus scheduler module 1207 is shown that routes the data packet to the at least one VM, the data packet routed through a virtual port to the at least one VM. The bus scheduler module 1207 is operatively connected to the CPU 1201. In some example embodiments, the priority to receive the data packet is based upon a SLA. Moreover, in some example embodiments, the data structure is a queue. A link scheduler module 1208 is shown that routes the data packet to the at least one VM, the data packet routed through a virtual port to the at least one VM.

Figure 13:
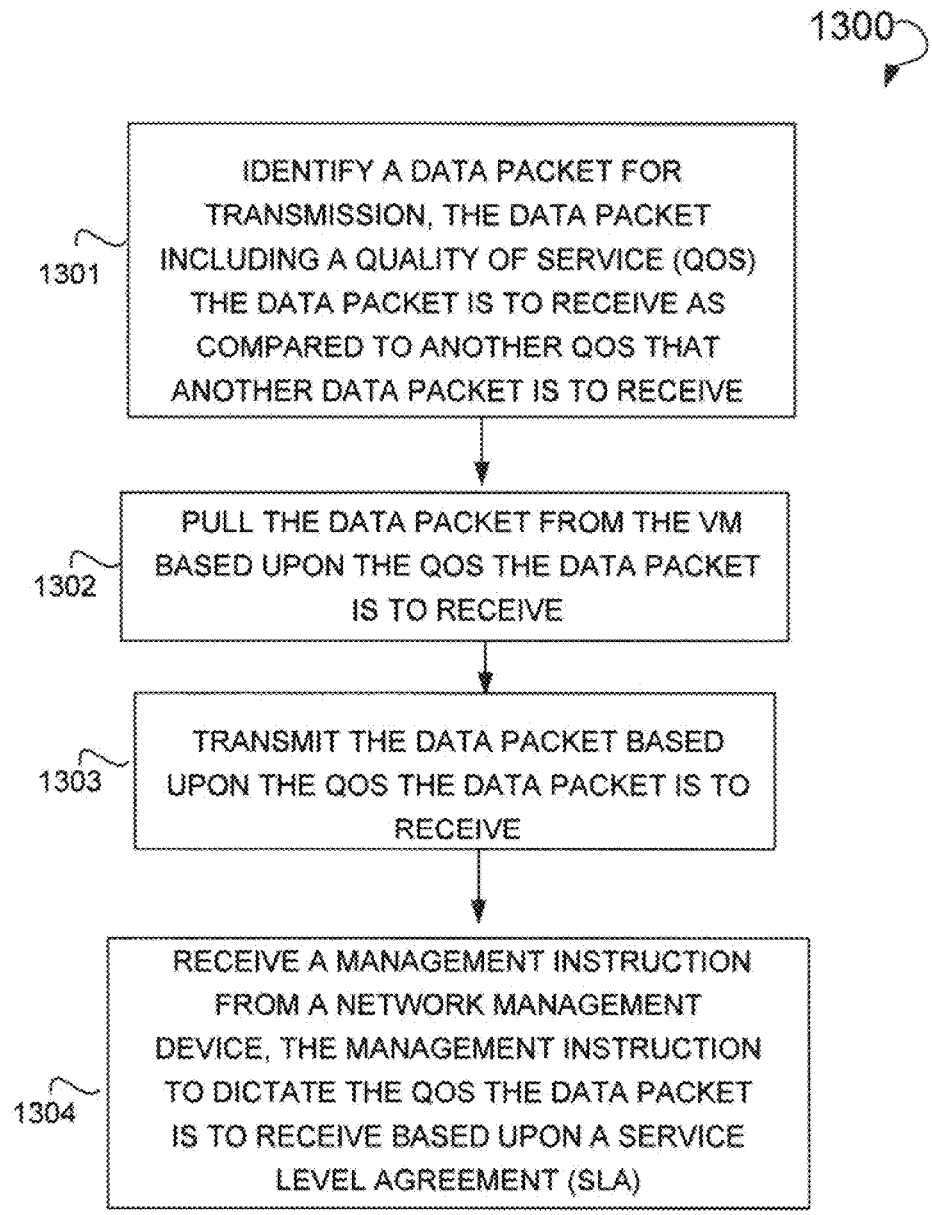
FIG. 13 is a diagram of a computer implemented method, according to an example embodiment, used to ensure end-to-end QoS for the VMs residing on a compute blades.

FIG. 13 is a diagram of an example computer implemented method 1300 used to ensure end-to-end QoS for the VMs residing on the compute blades 101, 102, 107, and 108. This method 1300 may be executed by a computer system such as one of the compute blades 101, 102, 107, or 108. Shown is an operation 1301 that is executed by the VM 1003 to identify a data packet for transmission, the data packet including a QoS the data packet is to receive as compared to another QoS that another data packet is to receive. Operation 1302 is executed by the SNIC 1004 to pull the data packet from the VM 1003 based upon the QoS the data packet is to receive. Operation 1303 is executed by the link scheduler module 1005 to transmit the data packet based upon the QoS the data packet is to receive. Operation 1304 is executed by the receiver 1006 to receive a management instruction from a network management device, the management instruction to dictate the QoS the data packet is to receive based upon a SLA. In some example embodiments, the VM assigns a descriptor to identify a device that is to receive the data packet. In some example embodiments, the memory module includes the data packet. Some example embodiments include the SNIC 1004 to pull of the data packet from the VM utilizes a pointer to an address of the data packet in the memory module. QoS may be ensured by the computer system through the use of at least one of DiffServ, RSVP, a control/management plane, or VLAN tagging. In some example embodiments, QoS includes at least one of the following considerations low delay, high throughput, or reliability.

Figure 14:
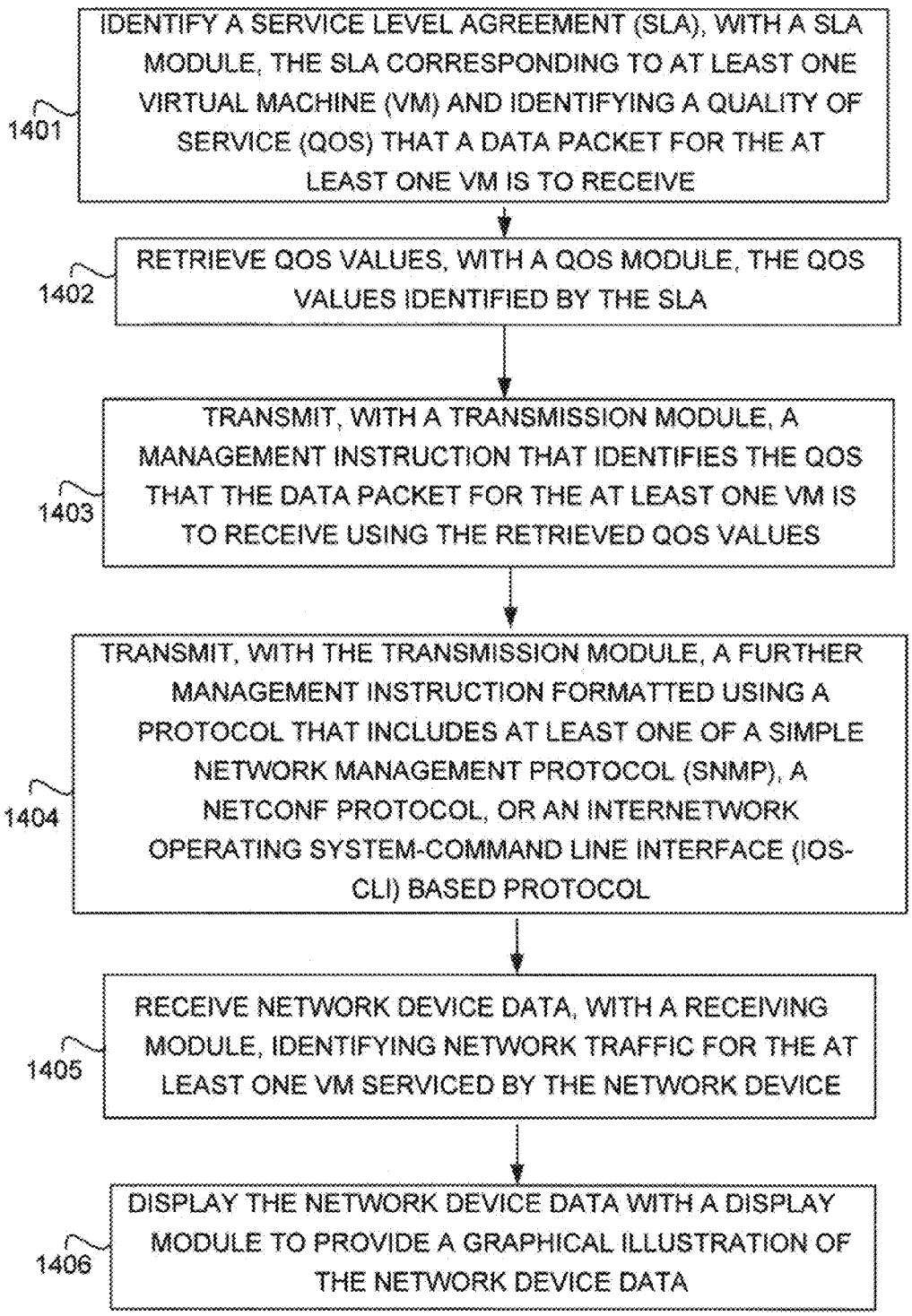
FIG. 14 is a diagram of a computer implemented method, according to an example embodiment, to implement a network management device.

FIG. 14 is a diagram of an example computer implemented method 1400 to implement a network management device. The operations of the method 1400 may be implemented by the network management device 105. Shown is an operation 1401 that is executed by the SLA module 1103 to identify an SLA corresponding to at least one VM and identifying a QoS that a data packet for the at least one VM is to receive. Also shown is an operation 1402 executed by a QoS module 1104 to retrieve QoS values identified by the SLA. Operation 1403 is executed by the transmission module 1105 to transmit a management instruction that identifies the QoS that the data packet for the at least one VM is to receive using the retrieved QoS values. This management instruction may include instructions related to the QoS on a per-flow basis (e.g., the QoS that individual flows are to receive). In some example embodiments, the management instruction is formatted as a CLI based instruction. Operation 1404 is executed by the transmission module 1106 to transmit a further management instruction formatted using a protocol that includes at least one of an SNMP, a Netconf protocol, or an IOS-CLI based protocol. In some example embodiments, the QoS is based upon considerations that include at least one of per hop low delay, per hop high throughput, or per hop reliability. Operation 1405 is executed by the receiving module 1107 to receive network device data identifying network traffic for the at least one VM serviced by the network device. Operation 1406 is executed by the display module 1108 to display the network device data to provide a graphical illustration of the network device data. In some example embodiments, the network device includes at least one of a SNIC, or a router.

Figure 15:
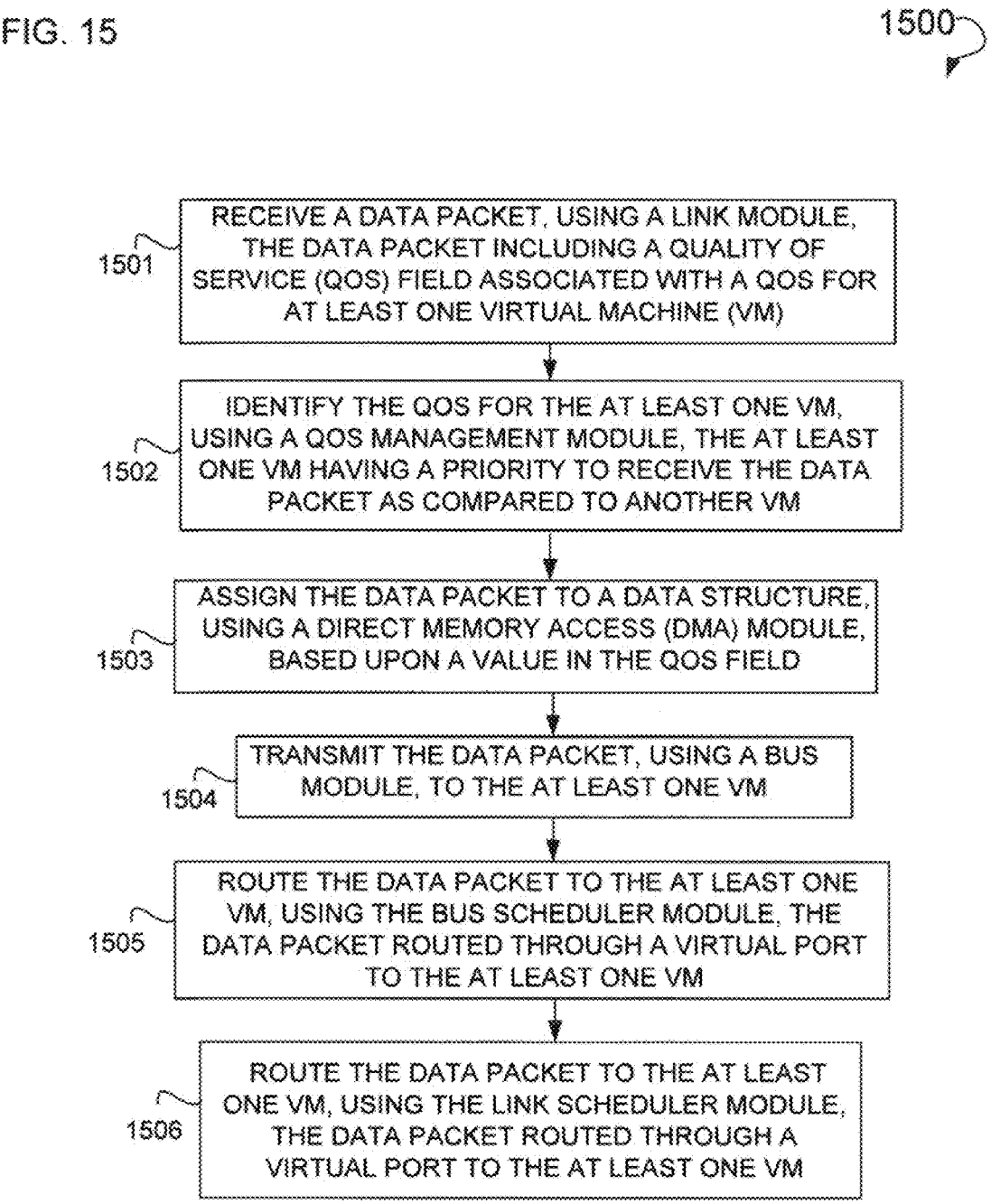
FIG. 15 is a diagram of a computer implemented method, according to an example embodiment, used to ensure end-to-end QoS for the VMs residing thereon.

FIG. 15 is a diagram of an example computer implemented method 1500 executed to ensure end-to-end QoS for the VMs residing thereon. The operations of the method 1500 may be implemented by the compute blades 101, 102, 107, or 108. Shown is an operation 1501 that is executed by the link module 1203 to receive a data packet, including a QoS field associated with a QoS for at least one VM. An operation 1502 is executed by the management module 1204 to identify the QoS for the at least one VM, the at least one VM having a priority to receive the data packet as compared to another VM. Operation 1503 is executed by the DMA module 1205 to assign the data packet to a data structure based upon a value in the QoS field. An operation 1504 is executed by the bus module 1206 to transmit the data packet to the at least one VM. In some example embodiments, the QoS field is a TOS field, or a PCP field. In some example embodiments, link module uses a link layer protocol. In some example embodiments, the QoS is based upon considerations that include at least one of per hop low delay, per hop high throughput, or per hop reliability. Operation 1505 is executed using the bus scheduler module 1207 to route the data packet to the at least one VM, the data packet routed through a virtual port to the at least one VM. In some example embodiments, the priority to receive the data packet is based upon a SLA. Further, in some example embodiments, the data structure is a queue. Operation 1506 is executed by the link scheduler module 1208 to route a data packet to at least one VM, where the data packet is routed through a virtual port to the at least one VM.

Figure 16:
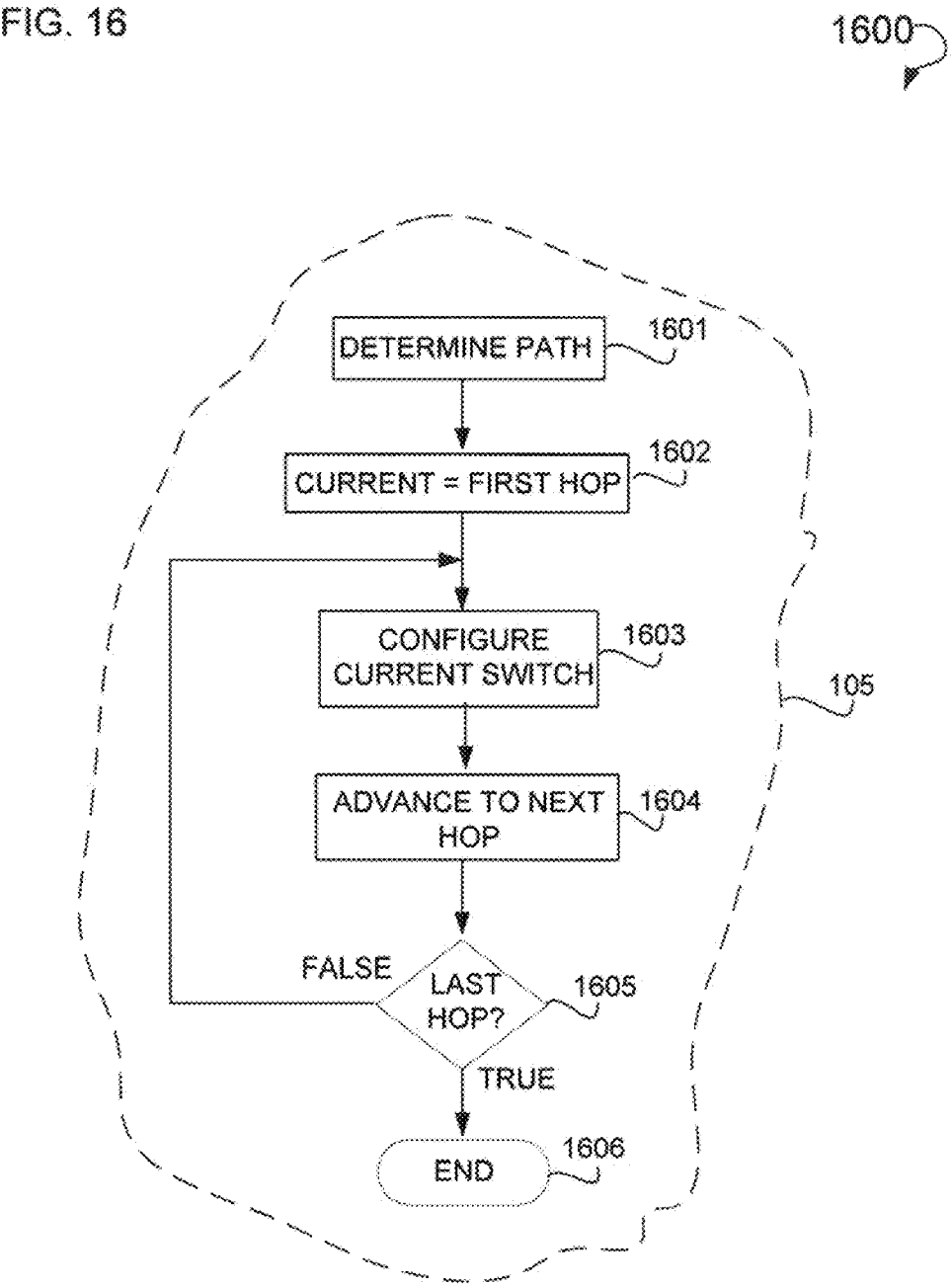
FIG. 16 is a flowchart illustrating execution of a method, according to an example embodiment, used to configure one or more network devices by the network management device.

FIG. 16 is a flowchart illustrating execution of an example method 1600 used to configure one or more network devices by the network management device 105. Shown are operations 1601 through 1606 that are executed, in part, by the network management device 105. An operation 1601 is executed to determine a path between two endpoints managed by a device 105. These endpoints may be the VMs 306 and 405 illustrated in FIG. 5. This path may be determined through the use of a spanning tree algorithm, Dijkstra's algorithm, the Floyd-Warshall algorithm, or some other suitable algorithm used to determine a path between end points in a network. Shown is an operation 1602 that, when executed, assigns a first hop to a current variable value. In some example embodiments, the execution of operation 1602 is optional depending upon the configuration settings for the network management device 105. Configuration settings include, whether, for example, the network management device 105 is configuring all hops along a shortest path, or only specific hops. An operation 1603 is executed to configure the current switch. Configuring the current switch includes, for example, assigning a priority value to each of the VMs serviced a SNIC. For example, a priority value is assigned to each of the VMs 304 through 306 serviced by the SNIC 205. Additionally, the data packets received by the SNIC 205 are processed based upon the priority value assigned to each VM, and the QoS value included in the header of the data packet. An operation 1604 is executed to advance the network management device 105 to the next hop for the purpose of configuration. The execution of operation 1604 may be optional in certain cases. Decisional operation 1605 is executed to determine whether or not a hop has been configured. In cases where decisional operation 1605 evaluates to "false," the operation 1603 and its subsequent operations are is executed. In cases where decisional operation 1605 evaluates to "true" a termination condition 1606 is executed.

Figure 17:
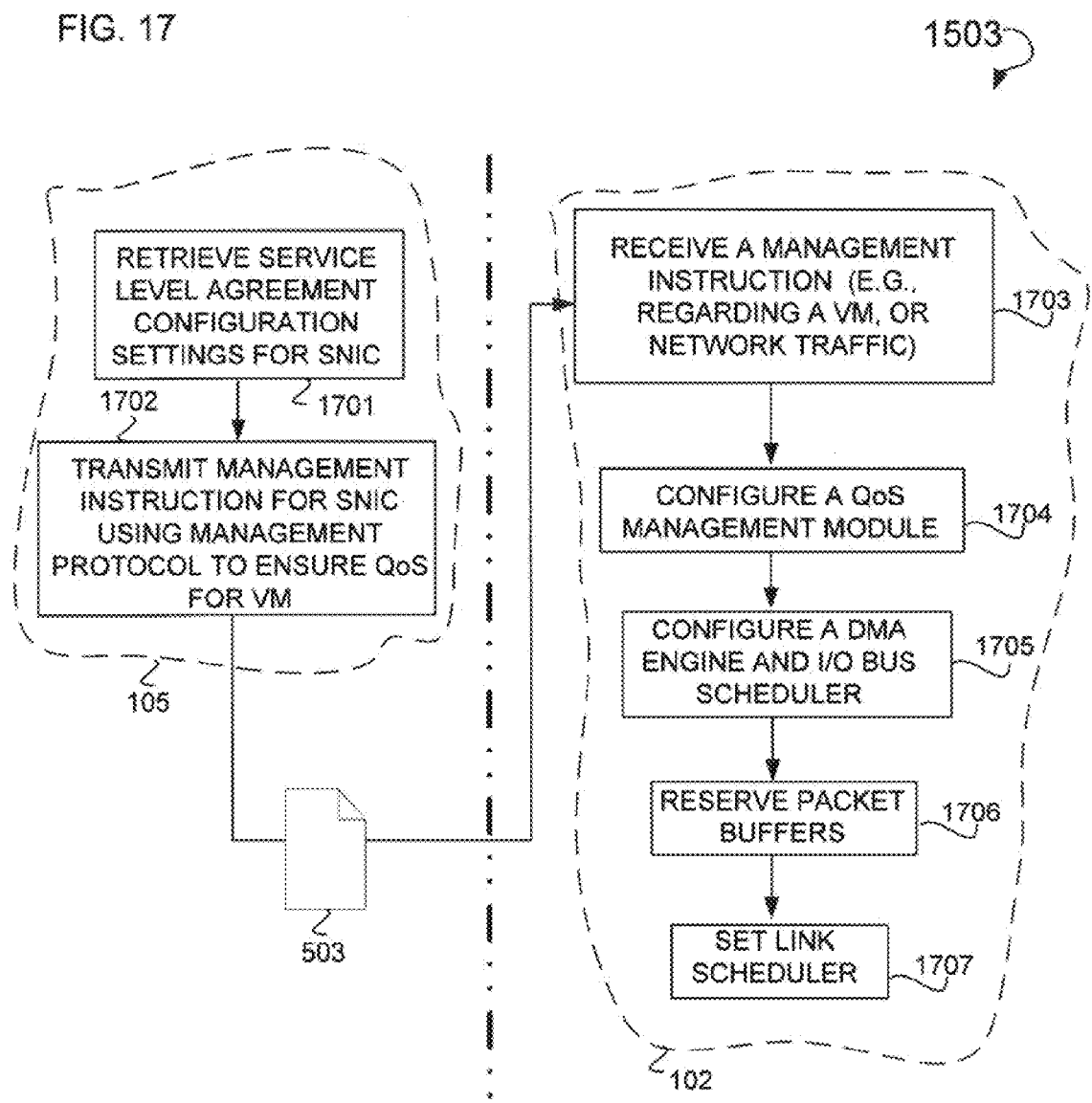
FIG. 17 is a dual-stream flowchart illustrating the execution of operation, according to an example embodiment, to configure a network device such as a switch.

FIG. 17 is a dual-stream flowchart illustrating the example execution of operation 1503. Shown are operations 1701 and 1702 that are executed on the network management device 105. Further, shown are operations 1703 through 1707 that are executed on the compute blade 102. Operation 1701 is executed to retrieve an SLA to configuration a setting for a particular SNIC. Several SLAs may be configured based upon the QoS guarantees for a particular VM serviced by a SNIC. Operation 1702 is executed to transmit a management instruction to the SNIC, where this management instruction 503 guarantees a QoS for a VM. An operation 1703 is executed to receive the managed instruction for a particular VM. Operation 1704 is executed to configure a QoS management module. The configuration may include the assigning of a priority value to a particular VM for the purpose of receiving or transmitting a data packet. Operation 1705 is executed to configure the DMA engine 605 and I/O bus scheduler 608. This configuration may include considerations including burstiness, a CPU cycles, and other types of system resources associated with the SNIC. Operation 1706 is executed to reserved packet buffers for incoming packets such as the data packet 502. Operation 1707 is executed to implement the link scheduler 601.

Figure 18:
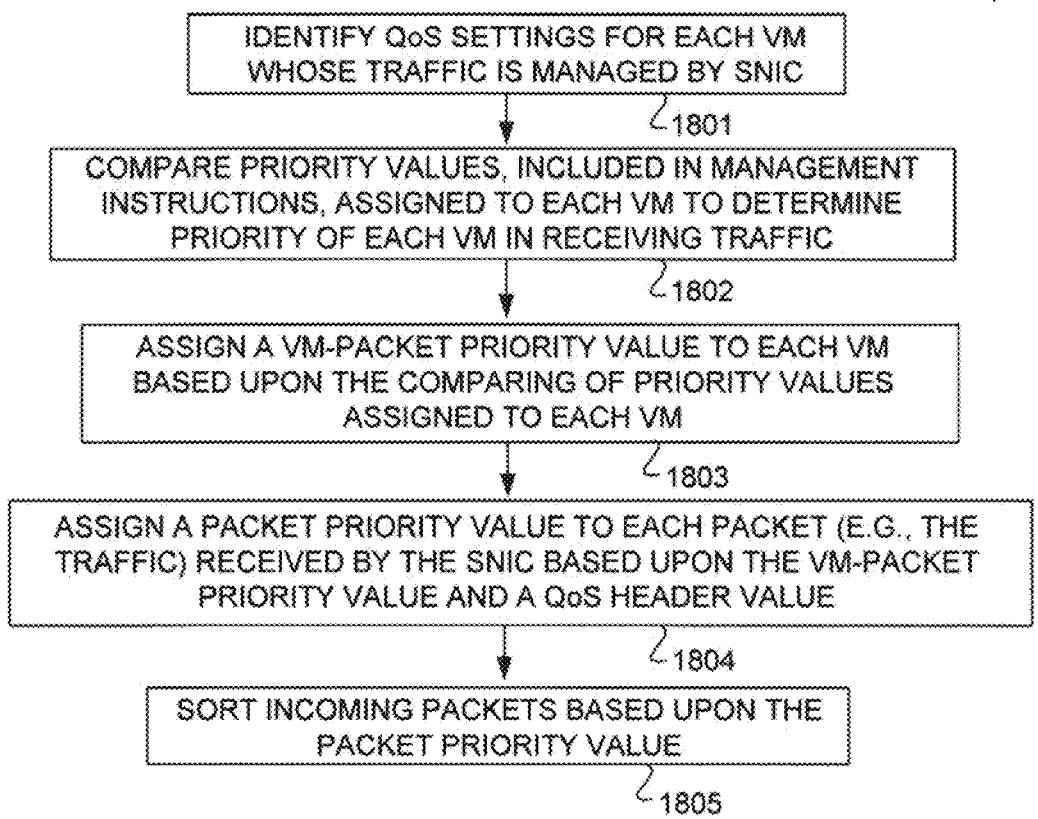
FIG. 18 is a flowchart illustrating the execution of an operation, according to an example embodiment, to configure a QoS management module to receive a data packet.

FIG. 18 is a flowchart illustrating the example execution of operation 1704. Shown are operations 1801 through 1805. With respect to the execution of operation 1801, when executed, operation 1801 identifies a QoS setting for each VM managed by a particular SNIC. Operation 1802 is executed to compare priority values, included in the managed instruction 503, assigned to each VM. A priority value may be an integer or other suitable numeric value. As illustrated elsewhere, these priority values determine the priority of each VM in receiving network traffic. Operation 1803 is executed assign a VM-packet priority value to VMs based upon comparing the priority values assigned to each VM. Operation 1804 is executed to assign a packet priority value to each data packet (e.g., data packets 501 and 502) based upon the VM packet priority value, and the QoS header value. Operation 1805 is executed so as to sort incoming data packets 501 based on the packet priority value. Once sorted, the data packets 501 are stored into the packet buffer 602. These data packets stored into the packet buffer 602 are distributed via the I/O scheduler 608 to the various VMs 304 through 306. This sorting is an example of an SLA enforced by the SNIC 205 (see generally FIGS. 7 and 8).

FIG. 19 is a flow chart illustrating an example operation 1704. Operation 1901 is executed to identify a data packet within memory controlled by a VM. This memory may be a virtual memory page. The data packet may be a data load. Operation 1902 is executed to allocate memory for a description of the data packet. This description may include an IP address of a VM or computer that is to receive the data packet. Operation 1903 is executed to fill in (e.g., assign) the description to the allocated memory. Operation 1904 is executed to assign a QoS value to data packet via assigning a QoS value to the allocated memory. Operation 1905 is executed to allocate a referent (e.g., a pointer) to the description. Operation 1906 is executed to pull the description from memory using the referent based upon the QoS the data packet is to receive relate to another data packet. Operation 1907 is executed to assemble the description and the data packet. In some example embodiments, the assembling of the description and the data packet includes affixing the description of the data packet as a header to the data packet. Operation 1908 is executed to transmit the data packet. In some example embodiments, a QoS for the data packet is ensured through the use of at least one of DiffServ, RSVP, a control/management plane, or VLAN tagging.

FIG. 20 is a diagram of an example computer system 2000. Shown is a CPU 2001. The CPU 201 may be a CPU 2001. In some example embodiments, a plurality of CPU may be implemented on the computer system 2000 in the form of a plurality of core (e.g., a multi-core computer system), or in some other suitable configuration. Some example CPUs includes the x86 series CPU. Operatively connected to the CPU 2001 is Static Random Access Memory (SRAM) 2002. Operatively connected includes a physical or logical connection such as, for example, a point to point connection, an optical connection, a bus connection or some other suitable connection. A North Bridge 2004 is shown, also known as a Memory Controller Hub (MCH), or an Integrated Memory Controller (IMC), that handles communication between the CPU and PCIe, Dynamic Random Access Memory (DRAM), and the South Bridge. A PCIe port 2003 is shown that provides a computer expansion port for connection to graphics cards and associated GPUs. An ethernet port 2005 is shown that is operatively connected to the North Bridge 2004. A Digital Visual Interface (DVI) port 2007 is shown that is operatively connected to the North Bridge 2004. Additionally, an analog Video Graphics Array (VGA) port 2006 is shown that is operatively connected to the North Bridge 2004. Connecting the North Bridge 2004 and the South Bridge 2011 is a point to point link 2009. In some example embodiments, the point to point link 2009 is replaced with one of the above referenced physical or logical connections. A South Bridge 2011, also known as an I/O Controller Hub (ICH) or a Platform Controller Hub (PCH), is also illustrated. Operatively connected to the South Bridge 2011 are a High Definition (HD) audio port 2008, boot RAM port 2012, PCI port 2010, Universal Serial Bus (USB) port 2013, a port for a Serial Advanced Technology Attachment (SATA) 2014, and a port for a Low Pin Count (LCP) bus 2015. Operatively connected to the South Bridge 2011 is a Super Input/Output (I/O) controller 2016 to provide an interface for low-bandwidth devices (e.g., keyboard, mouse, serial ports, parallel ports, disk controllers). Operatively connected to the Super I/O controller 2016 is a parallel port 2017, and a serial port 2018.

The SATA port 2014 may interface with a persistent storage medium (e.g., an optical storage devices, or magnetic storage device) that includes a machine-readable medium on which is stored one or more sets of instructions and data structures (e.g., software) embodying or utilized by any one or more of the methodologies or functions illustrated herein. The software may also reside, completely or at least partially, within the SRAM 2002 and/or within the CPU 2001 during execution thereof by the computer system 2000. The instructions may further be transmitted or received over the 10/100/1000 ethernet port 2005, USB port 2013 or some other suitable port illustrated herein.

In some example embodiments, a removable physical storage medium is shown to be a single medium, and the term "machine-readable medium" should be taken to include a single medium or multiple medium (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Data and instructions (of the software) are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer system comprising:
   a memory storing computer executable instructions;
   a processor coupled to the memory, the processor executing the computer executable instructions to:
   receive, at an output queue in communication with a Virtual Machine (VM) running a particular application, a data packet from an input queue, wherein the output queue contains data packets associated with the particular application and the input queue contains data packets associated with multiple applications;
   assign a priority to the VM based on a type of application running on the VM;
   sort the data packets in the input queue based on the priority assigned to the VM;
   pull the data packet from the VM with a Switch Network Interface Card (SNIC) based upon a Quality of Service (QoS) the data packet is to receive, the data packet including the QoS, wherein the QoS is identified by the VM;
   receive a management query with the SNIC from a network management device, transmit a management response from the SNIC to the network management device, wherein the management response includes central processing unit cycles utilized by the VM; and
   transmit the data packet from the SNIC based upon the QoS the data packet is to receive.

2. The computer system of claim 1, comprising a receiver to receive a management instruction from the network management device, the management instruction to dictate the QoS the data packet is to receive based upon a Service Level Agreement (SLA).

3. The computer system of claim 1, wherein the VM assigns a descriptor to identify a device that is to receive the data packet.

4. The computer system of claim 1, comprising a memory module that includes the data packet.

5. The computer system of claim 4, wherein the SNIC, to pull the data packet from the VM, utilizes a pointer to an address of the data packet in the memory module.

6. The computer system of claim 1, wherein QoS is ensured by the computer system through the use of at least one of Differentiated Services (DiffServ), Resource ReSerVation Protocol (RSVP), a control/management plane, or Virtual Local Area Network (VLAN) tagging.

7. The computer system of claim 1, wherein the QoS includes at least one of the following considerations low delay, high throughput, or reliability.

8. A computer implemented method comprising:
   receiving, at an output queue in communication with a Virtual Machine (VM) running a particular application, a data packet from an input queue, wherein the output queue contains data packets associated with the particular application and the input queue contains data packets associated with multiple applications;
   assigning a priority to the VM based on a type of application running on the VM;
   sorting the data packets in the input queue associated with the particular application based on the priority assigned to the VM;
   pulling, with a network device, the data packet from the VM based upon a Quality of Service (QoS) the data packet is to receive, wherein the QoS is identified on a Service Level Agreement (SLA), with a SLA module, and wherein a QoS value is retrieved by a QoS module from the SLA;
   receiving, with the network device, a management query from a network management device and transmitting, with the network device, a management response to the network management device, wherein the management response includes central processing unit cycles utilized by the VM; and transmitting, with the network management device, a management instruction that identifies the QoS that the data packet for the VM is to receive using the retrieved QoS values.

9. The computer implemented method of claim 8, wherein the management instruction is formatted as a Command Line Interface (CLI) based instruction.

10. The computer implemented method of claim 8, comprising transmitting, with the transmission module, a further management instruction formatted using a protocol that includes at least one of a Simple Network Management Protocol (SNMP), a Netconf protocol or an Internetwork Operating System-Command Line Interface (IOS-CLI) based protocol.

11. The computer implemented method of claim 8, wherein the QoS is based upon considerations that include at least one of per hop low delay, per hop high throughput, or per hop reliability.

12. The computer implemented method of claim 8, comprising:

receiving network device data, with a receiving module, identifying network traffic for the VM serviced by the network device; and displaying the network device data with a display module to provide a graphical illustration of the network device data.

13. The computer implemented method of claim 12, wherein the network device includes at least one of a Switch Network Interface Card (SNIC), or a router.

14. A computer implemented method comprising:

receiving a data packet associated with a particular application at an input queue that contains data packets associated with multiple applications;

transmitting the data packet associated with the particular application to an output queue, wherein the output queue only contains data packets associated with the particular application, the data packet associated with the particular application including a Quality of Service (QoS) field associated with a QoS for a Virtual Machine (VM) running the particular application;

identifying the QoS for the VM, the VM having a priority to receive the data packet associated with the particular application as compared to another VM, wherein the priority is based upon a type of application run by the VM;

sorting the data packets in the input queue based on the priority assigned to the VM; and transmitting the data packet to the VM, from the output queue;

pulling, with a Switch Network Interface Card (SNIC), the data packet from the VM; and receiving, with the SNIC, a management query from a network management device and transmitting a management response from the SNIC to the network management device, wherein the management response includes central processing unit cycles utilized by the at least one VM.

15. The computer implemented method of claim 14, wherein the QoS field includes at least one of a Type of Service (TOS) field, or a Priority Code Point (PCP) field.

16. The computer implemented method of claim 14, comprising receiving the data packet with a link module, wherein the link module uses a link layer protocol.

17. The computer implemented method of claim 14, wherein the QoS is based upon considerations that include at least one of per hop low delay, per hop high throughput, or per hop reliability.

18. The computer implemented method of claim 17, comprising routing the data packet to the VM, using a bus scheduler module, the data packet routed through a virtual port to the at least one VM.

19. The computer implemented method of claim 17, comprising routing the data packet to the VM, using a link scheduler, the data packet routed through a virtual port to the VM.

20. The computer implemented method of claim 14, wherein the priority to receive the data packet is based upon a Service Level Agreement (SLA).

\* \* \* \* \*